United States Patent
Fang et al.

(10) Patent No.: US 12,008,121 B2
(45) Date of Patent: Jun. 11, 2024

(54) FILE PROCESSING METHOD AND TERMINAL DEVICE

(71) Applicant: HUAWEI TECHNOLOGIES CO., LTD., Guangdong (CN)

(72) Inventors: Xiwen Fang, Shanghai (CN); Qiang Wei, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 351 days.

(21) Appl. No.: 17/434,446

(22) PCT Filed: Feb. 28, 2019

(86) PCT No.: PCT/CN2019/076567
§ 371 (c)(1),
(2) Date: Aug. 27, 2021

(87) PCT Pub. No.: WO2020/172874
PCT Pub. Date: Sep. 3, 2020

(65) Prior Publication Data
US 2022/0147641 A1     May 12, 2022

(51) Int. Cl.
*G06F 21/62*     (2013.01)
*G06F 21/31*     (2013.01)
(Continued)

(52) U.S. Cl.
CPC .......... *G06F 21/6209* (2013.01); *G06F 21/31* (2013.01); *G06F 21/602* (2013.01); *G06F 21/606* (2013.01); *G06F 21/107* (2023.08)

(58) Field of Classification Search
CPC .... G06F 21/6209; G06F 21/31; G06F 21/602; G06F 21/606; G06F 21/107;
(Continued)

(56) References Cited

U.S. PATENT DOCUMENTS 8,799,634 B2 *  8/2014  Courtney .............. G06F 21/602
                                                    713/1
8,826,013 B1     9/2014  Kodukula et al.
(Continued)

FOREIGN PATENT DOCUMENTS

CN     101840472 A     9/2010
CN     101938459 A     1/2011
(Continued)

OTHER PUBLICATIONS

Office Action issued in CN201980039784.X, dated Jun. 3, 2021, 9 pages.
(Continued)

*Primary Examiner* — Matthew Smithers

(57) ABSTRACT

The present technology relates to a file processing method. The file processing method can includes a first terminal device receiving an encrypted file from a second terminal device. The first terminal device stores the encrypted file. The first terminal device receives an access instruction for the encrypted file. The first terminal device obtains a current security state. When the current security state is higher than or equal to a first security state, the first terminal device decrypts the file by using a decryption key. It can be learned that according to the method, after the first terminal device receives the encrypted file, the first terminal device decrypts the file by using the decryption key only when a security state is high.

20 Claims, 23 Drawing Sheets

(51) Int. Cl.
*G06F 21/60* (2013.01)
*G06F 21/10* (2013.01)

(58) Field of Classification Search
CPC ......... G06F 2221/2113; G06F 21/6218; H04L 9/3247; H04L 9/3263; H04L 63/062; H04L 63/105; H04L 63/0428; H04L 9/0819; H04L 63/06; H04L 67/06
See application file for complete search history.

(56) References Cited

U.S. PATENT DOCUMENTS

| | | | |
|---|---|---|---|
| 10,009,184 | B1 | 6/2018 | Baldwin et al. |
| 10,917,408 | B2 * | 2/2021 | Kamiya ................ H04L 63/105 |
| 2002/0059239 | A1 * | 5/2002 | Yanagi ................... G06F 16/93 |
| | | | 707/999.009 |
| 2006/0064736 | A1 * | 3/2006 | Ahuja ................... G06Q 20/027 |
| | | | 713/176 |
| 2009/0193262 | A1 * | 7/2009 | Sweazey ................... H04L 9/08 |
| | | | 713/182 |
| 2010/0037295 | A1 * | 2/2010 | Oh ........................ G06F 21/604 |
| | | | 709/229 |
| 2011/0296199 | A1 * | 12/2011 | Kinghorn ................ H04L 63/20 |
| | | | 713/189 |
| 2013/0166899 | A1 * | 6/2013 | Courtney ............ G06F 9/44505 |
| | | | 713/100 |
| 2013/0232335 | A1 * | 9/2013 | King ................ H04W 12/0431 |
| | | | 713/168 |
| 2016/0360402 | A1 | 12/2016 | Park et al. |
| 2017/0140152 | A1 * | 5/2017 | Samsonov ............ H04L 9/3247 |
| 2018/0239917 | A1 | 8/2018 | Takano |
| 2018/0341781 | A1 * | 11/2018 | Wang .................. G06F 21/6245 |
| 2020/0028853 | A1 * | 1/2020 | Ford ...................... H04L 63/105 |
| 2021/0303640 | A1 * | 9/2021 | Kamiya ................... G06F 8/61 |

FOREIGN PATENT DOCUMENTS

| | | |
|---|---|---|
| CN | 103117853 A | 5/2013 |
| CN | 103390026 A | 11/2013 |
| CN | 103475463 A | 12/2013 |
| CN | 105335672 A | 2/2016 |
| CN | 105550866 A | 5/2016 |
| CN | 105634737 A | 6/2016 |
| CN | 106203137 A | 12/2016 |
| CN | 107425970 A | 12/2017 |
| CN | 108959943 A | 12/2018 |
| KR | 20040011695 A | 2/2004 |
| KR | 100989082 B1 | 10/2010 |
| KR | 20150073826 A | 7/2015 |

OTHER PUBLICATIONS

International Search Report and Written Opinion issued in PCT/CN2019/076567, dated Oct. 12, 2012, 9 pages.
Indian Office Action for Application No. 202117035602 dated Mar. 28, 2022, 6 pages.
Notice of Allowance for Chinese Application No. 201980039784 dated Nov. 3, 2021, 4 pages.
Office Action dated Jan. 26, 2023 for Korean Application No. 10-2021-7027050, 13 pages.

* cited by examiner

CONT.
FROM
FIG. 17A

CONT.
FROM
FIG. 17A

1708: Store the encrypted file

1709: Establish a correspondence between the encrypted file and the decryption key 1710: Receive an access instruction for the encrypted file 1711: Obtain the decryption key corresponding to the file, and obtain the first security state corresponding to the decryption key 1712: Obtain a current security state 1713: When the current security state is higher than or equal to the first security state, decrypt the file by using the decryption key

FIG. 17B

CONT.
FROM
FIG. 19A

CONT.
FROM
FIG. 19A

1908: Store the encrypted file

1909: Establish a correspondence between the encrypted file and the decryption key, and establish a correspondence between the first security state and the decryption key 1910: Receive an access instruction for the encrypted file 1911: Obtain the decryption key corresponding to the file, and obtain the first security state corresponding to the decryption key 1912: Obtain a current security state 1913: When the current security state is higher than or equal to the first security state, decrypt the file by using the decryption key

FIG. 19B

FILE PROCESSING METHOD AND TERMINAL DEVICE

CROSS-REFERENCE TO RELATED APPLICATION(S)

This application is the U.S. national phase of International Application No. PCT/CN2019/076567 filed 28 Feb. 2019, the entire contents of which is hereby incorporated by reference.

TECHNICAL FIELD

The present technology relates to the field of terminal technologies, and in particular, to a file processing method and a terminal device.

BACKGROUND

Security of files (for example, a document file and a picture file) is very important to a user. To improve file security, the user usually sets some security policies on a terminal device to protect files on the terminal device. For example, the user sets a screen lock password on the terminal device to prevent others from browsing data on the terminal device at will. Alternatively, the user enables anti-root protection on the terminal device to prevent the terminal device from being rooted. Usually, after the terminal device is rooted, data is easily stolen from the terminal device by using a malicious application.

However, even if relatively high security is configured for a sending terminal, after the sending terminal sends a file to a receiving terminal, the sending terminal cannot ensure security of the file on the receiving terminal. For example, a screen lock password may not be set on the receiving terminal or the receiving terminal may be rooted. Consequently, the file may be stolen from the receiving terminal. Therefore, how to improve security of the file on the receiving terminal is a problem needing to be resolved.

SUMMARY

Embodiments of the present technology disclose a file processing method and a terminal device, to help improve security of a file on a receiving terminal.

According to a first aspect, an embodiment of this application provides a file processing method. The method includes a first terminal device receiving an encrypted file from a second terminal device. The first terminal device stores the encrypted file. The first terminal device receives an access instruction for the encrypted file. The first terminal device obtains a current security state. When the current security state is higher than or equal to a first security state, the first terminal device decrypts the file by using a decryption key. It can be learned that according to the method in the first aspect, after the first terminal device receives the encrypted file, the first terminal device decrypts the file by using the decryption key only when a security state is high. Therefore, security of the file on the first terminal device is improved.

In an optional implementation, the first security state is a security state corresponding to the decryption key. Before the first terminal device receives the encrypted file from the second terminal device, the first terminal device may further perform the following steps: the first terminal device receives an obtaining request from the second terminal device. The first terminal device obtains the current first security state of the first terminal device in response to the obtaining request. The first terminal device sends the first security state to the second terminal device. Based on the optional implementation, the second terminal device may be enabled to obtain a security state of the first terminal device, so that the second terminal device can send the file only when the security state of the first terminal device is high. If the second terminal device sends the file when the security state of the first terminal device is high, the first terminal device can decrypt the file by using the decryption key only when the security state is high. Therefore, based on the optional implementation, the second terminal device can perform security control on the file to be sent to the first terminal device.

In an optional implementation, the first terminal device may further perform the following steps: the first terminal device obtains an encryption key and the decryption key in response to the obtaining request. The first terminal device sends the encryption key to the second terminal device. The first terminal device establishes a correspondence between the first security state and the decryption key. After receiving the encrypted file from the second terminal device, the first terminal device may further establish a correspondence between the file and the decryption key. Based on the optional implementation, the first terminal device may generate the encryption key and the decryption key.

In an optional implementation, before receiving the access instruction for the encrypted file, the first terminal device may further perform the following steps: the first terminal device receives the decryption key from the second terminal device. The first terminal device establishes a correspondence between the file and the decryption key, and establishes a correspondence between the first security state and the decryption key. Based on the optional implementation, the second terminal device may generate an encryption key and the decryption key.

In an optional implementation, after obtaining the current first security state of the first terminal device, the first terminal device may further obtain a signature for the first security state. A specific implementation in which the first terminal device sends the first security state to the second terminal device is as follows: the first terminal device sends the first security state, the signature, and a device certificate of the first terminal device to the second terminal device. If verification succeeds, it indicates that the first security state is sent by the first terminal device. If verification fails, it indicates that the first security state is not sent by the first terminal device, and a security risk exists. Therefore, based on the optional implementation, the security risk can be identified, to help improve file security.

In an optional implementation, when the current security state is lower than the first security state, the first terminal device prompts that the file cannot be accessed and prompts for a reason why the file cannot be accessed. In this way, a user can find, in a timely manner, the reason why the file cannot be accessed.

In an optional implementation, when the current security state is lower than the first security state, the first terminal device outputs a security configuration function button based on the current security state. In this way, the user can conveniently perform security configuration.

According to a second aspect, an embodiment of this application provides a file processing method. The method includes a second terminal device sending an obtaining request to a first terminal device. The second terminal device receives a first security state of the first terminal device that is sent by the first terminal device in response to the obtaining request. The second terminal device determines, based on the first security state, whether the second terminal device is allowed to send a file to the first terminal device. When the second terminal device determines, based on the first security state, that the second terminal device is allowed to send the file to the first terminal device, the second terminal device encrypts the file by using an encryption key. The second terminal device sends the encrypted file to the first terminal device. According to the method in the second aspect, the second terminal device can perform security control on the file to be sent to the first terminal device.

In an optional implementation, before the second terminal device determines, based on the first security state, whether the second terminal device is allowed to send the file to the first terminal device, the second terminal device further receives the encryption key sent by the first terminal device in response to the obtaining request. Based on the optional implementation, the first terminal device may generate the encryption key and a decryption key.

In an optional implementation, before encrypting the file by using the encryption key, the second terminal device further generates the encryption key and a decryption key. After generating the encryption key and the decryption key, the second terminal device further sends the decryption key to the first terminal device. Based on the optional implementation, the second terminal device may generate the encryption key and the decryption key.

In an optional implementation, a specific implementation in which the second terminal device receives the first security state of the first terminal device that is sent by the first terminal device in response to the obtaining request is as follows: the second terminal device receives the first security state of the first terminal device, a signature, and a device certificate of the first terminal device that are sent by the first terminal device in response to the obtaining request, where the signature is a signature for the first security state. The second terminal device may further verify the signature based on the first security state and the device certificate of the first terminal device. If the verification succeeds, the second terminal device determines, based on the first security state, whether the second terminal device is allowed to send the file to the first terminal device. Based on the optional implementation, a security risk can be identified, to help improve file security.

In an optional implementation, a specific implementation in which the second terminal device determines, based on the first security state, whether the second terminal device is allowed to send the file to the first terminal device is as follows: the second terminal device prompts for a security state of the first terminal device based on the first security state, and prompts whether the second terminal device is allowed to send the file to the first terminal device. When the second terminal device receives a sending allowed operation of a user, the second terminal device determines that the second terminal device is allowed to send the file to the first terminal device. When the second terminal device receives a sending cancelled operation of a user, the second terminal device determines that the second terminal device is not allowed to send the file to the first terminal device. Based on the optional implementation, the user may manually select whether to send a target file. In this way, the sender can flexibly determine whether to send the target file to the receiver.

In an optional implementation, a specific implementation in which the second terminal device determines, based on the first security state, whether the second terminal device is allowed to send the file to the first terminal device is as follows: the second terminal device determines whether the first security state is higher than or equal to a preset security state. When the first security state is higher than or equal to the preset security state, the second terminal device determines that the second terminal device is allowed to send the file to the first terminal device. When the first security state is lower than the preset security state, the second terminal device determines that the second terminal device is not allowed to send the file to the first terminal device. Based on the optional implementation, the second terminal device may automatically determine, based on a target security state, whether to send a target file to the first terminal device.

In an optional implementation, when the second terminal device determines that the second terminal device is not allowed to send the file to the first terminal device, the second terminal device sends prompt information to the first terminal device, where the prompt information is used to prompt for a reason for canceling sending of the file to the first terminal device. Based on the optional implementation, the user of the first terminal device can find, in a timely manner, a reason why the file fails to be received.

In an optional implementation, when determining that the second terminal device is not allowed to send the file to the first terminal device, the second terminal device outputs a reason option for canceling sending of the file to the first terminal device. The second terminal device receives a selection operation performed by the user on the reason option, where the prompt information used to prompt for the reason for canceling sending of the file to the first terminal device includes a reason for selecting the selection operation. Based on the optional implementation, the user of the first terminal device can be flexibly notified, based on a user's requirement, of a reason why the file fails to be received.

In an optional implementation, before sending the obtaining request to the first terminal device, the second terminal device may further perform the following steps: the second terminal device receives a data sending instruction used to send the file to the first terminal device. The second terminal device determines whether the file is data of a preset protection type. If the file is the data of the preset protection type, the second terminal device sends the obtaining request to the first terminal device. Based on the optional implementation, files with different security requirements can be sent in different manners.

In an optional implementation, before sending the obtaining request to the first terminal device, the second terminal device may further perform the following steps: the second terminal device outputs file sending mode options. The second terminal device receives a selection operation performed by the user on an option of a secure file sending mode in the file sending mode options. The second terminal device enters the secure file sending mode in response to the selection operation. A specific implementation in which the second terminal device sends the obtaining request to the first terminal device is as follows: the second terminal device sends the obtaining request to the first terminal device in the secure file sending mode. Based on the optional implementation, different file sending modes can be flexibly selected based on a user's requirement to send files.

According to a third aspect, a terminal device is provided, and may perform the method according to any one of the first aspect or the optional implementations of the first aspect, or any one of the second aspect or the optional implementations of the second aspect. The function may be implemented by hardware, or may be implemented by hardware executing corresponding software. The hardware or the software includes one or more modules corresponding to the function. The module may be software and/or hardware. Based on a same inventive concept, for problem-resolving principles and beneficial effects of the terminal device, refer to any one of the first aspect or the optional implementations of the first aspect, or any one of the second aspect or the optional implementations of the second aspect and beneficial effects.

According to a fourth aspect, a terminal device is provided. The terminal device includes a processor and a memory operatively coupled to the processor. The memory includes computer readable instructions. The processor is configured to execute the computer readable instructions in the memory, to enable the terminal device to perform the solution according to any one of the first aspect or the optional implementations of the first aspect, or any one of the second aspect or the optional implementations of the second aspect. Optionally, the terminal device further includes a transceiver connected to the processor, and the transceiver is configured to implement communication between the terminal device and another network element. For problem-resolving implementations and beneficial effects of the terminal device, refer to any one of the first aspect or the optional implementations of the first aspect, or any one of the second aspect or the optional implementations of the second aspect and beneficial effects.

According to a fifth aspect, a computer program product is provided. When the computer program product runs on a computer, the computer is enabled to perform the method according to any one of the first aspect or the optional implementations of the first aspect, or any one of the second aspect or the optional implementations of the second aspect.

According to a sixth aspect, a chip product is provided, and performs the method according to any one of the first aspect or the optional implementations of the first aspect, or any one of the second aspect or the optional implementations of the second aspect.

According to a seventh aspect, a computer readable storage medium is provided. The computer readable storage medium stores instructions. When the instructions are run on a computer, the computer is enabled to perform the method according to any one of the first aspect or the optional implementations of the first aspect, or any one of the second aspect or the optional implementations of the second aspect.

BRIEF DESCRIPTION OF DRAWINGS

To describe the technical solutions in the embodiments of the present technology more clearly, the following briefly describes the accompanying drawings required for describing the embodiments. It is clear that the accompanying drawings in the following descriptions show merely some embodiments of the present technology, and persons of ordinary skill in the art may still derive other drawings from these accompanying drawings without creative efforts.

FIG. 17A and FIG. 17B are example schematic flowcharts of another file processing method according to an embodiment of the present technology;

FIG. 19A and FIG. 19B are example schematic flowcharts of another file processing method according to an embodiment of the present technology.

DESCRIPTION OF EMBODIMENTS

To make the objectives, technical solutions, and advantages of the present technology clearer, the following describes the technical solutions of the embodiments of the present technology with reference to the accompanying drawings.

The embodiments of this application provide a file processing method and a terminal device, to improve security of a file on a receiving terminal.

To better understand the embodiments of this application, the following describes a system architecture to which the embodiments of this application are applicable.

Figure 1:
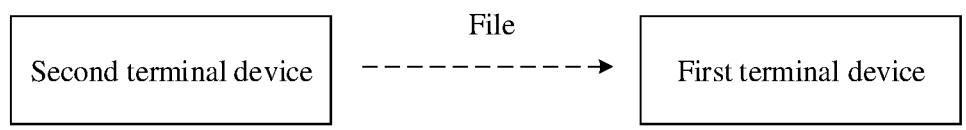
FIG. 1 is an example schematic diagram of a system architecture according to an embodiment of the present technology.

FIG. 1 is a schematic diagram of a system architecture according to an embodiment of this application. As shown in FIG. 1, the system architecture includes two terminal devices: a first terminal device and a second terminal device. The first terminal device and the second terminal device each may be a device such as a mobile phone, a tablet computer, a wearable device, a vehicle-mounted device, a terminal device in the internet of things, or a virtual reality device. The second terminal device is a sender of a file (for example, a document, a picture file, or a music file) in this embodiment of this application. The first terminal device is a receiver of a file (for example, a document, a picture file, or a music file) in this embodiment of this application.

To better understand the embodiments of this application, the following describes a structure of the terminal device in the embodiments of this application. A terminal device 200 shown in FIG. 2 may be the first terminal device or the second terminal device. A software system of the terminal device 200 that is shown in FIG. 3 may be a software system of the first terminal device or a software system of the second terminal device.

Figure 2:
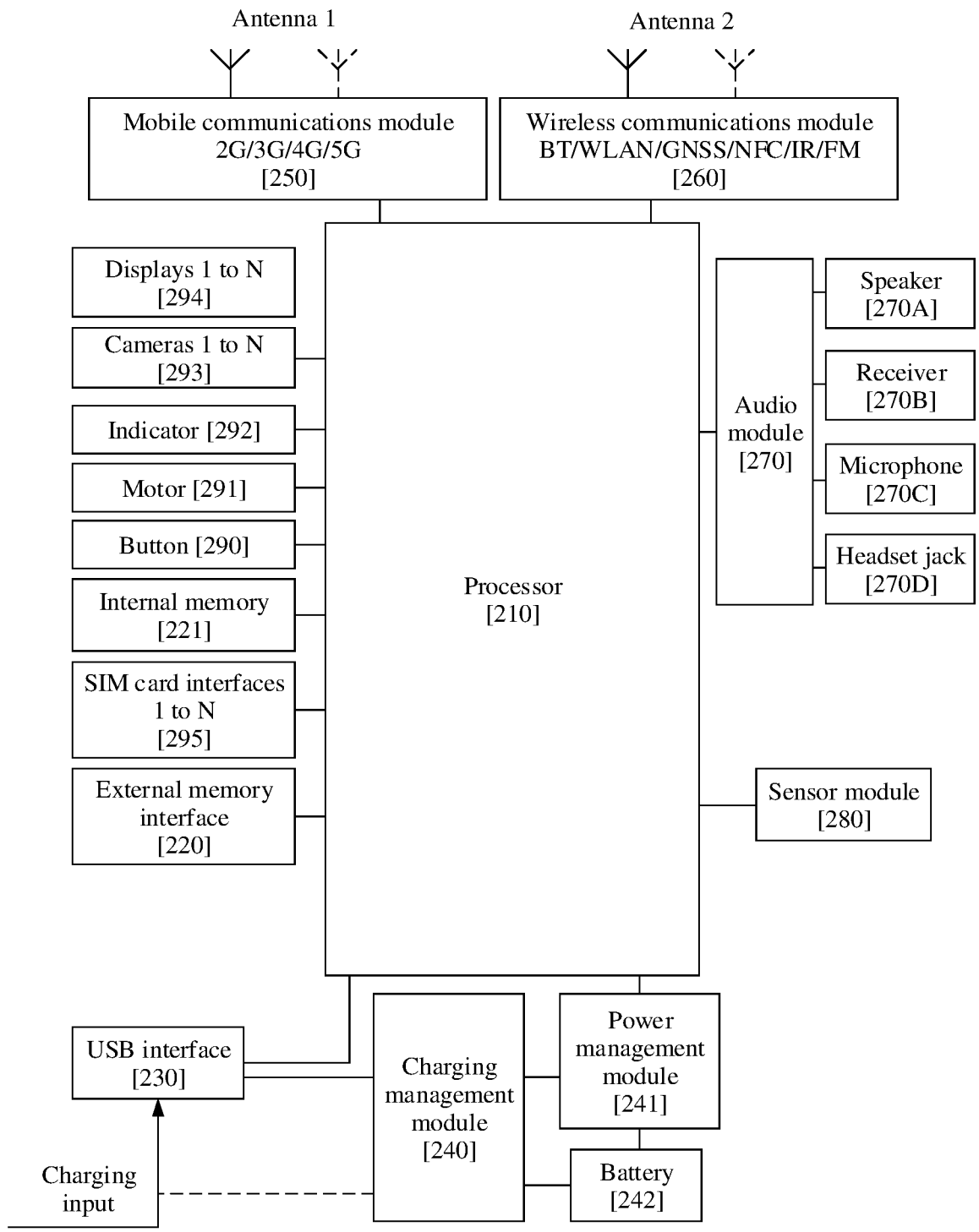
FIG. 2 is an example schematic structural diagram of a terminal device according to an embodiment of the present technology.
Figure 3:
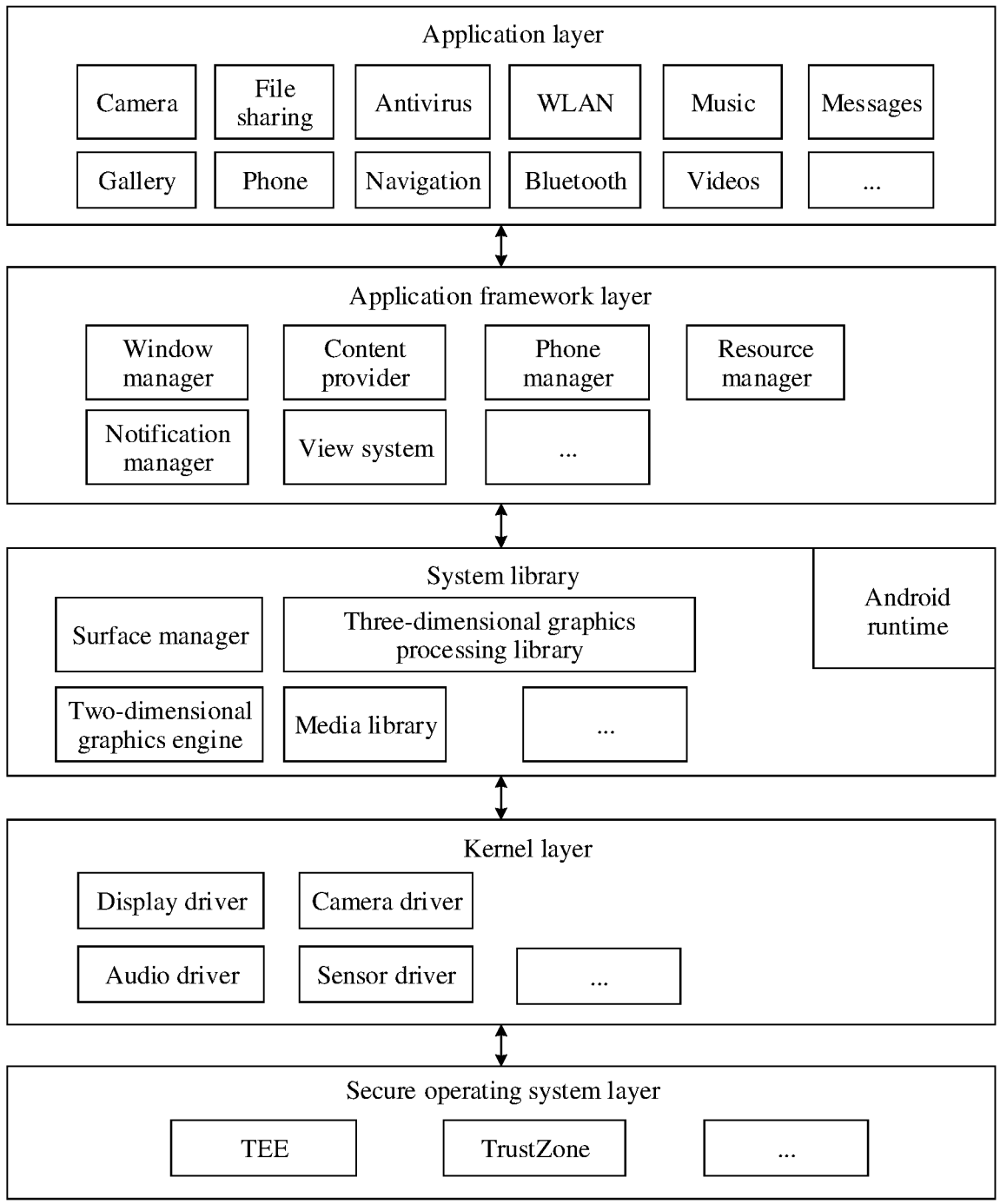
FIG. 3 is an example schematic structural diagram of a software system of a terminal device according to an embodiment of the present technology.

FIG. 2 is a schematic structural diagram of the terminal device 200. The terminal device 200 may include a processor 210, an external memory interface 220, an internal memory 221, a universal serial bus (USB) interface 230, a charging management module 240, a power management module 241, a battery 242, an antenna 1, an antenna 2, a mobile communications module 250, a wireless communications module 260, an audio module 270, a speaker 270A, a receiver 270B, a microphone 270C, a headset jack 270D, a sensor module 280, a button 290, a motor 291, an indicator 292, a camera 293, a display 294, a subscriber identification module (SIM) card interface 295, and the like. It may be understood that the structure shown in this embodiment of the present technology does not constitute a specific limitation on the terminal device 200. In some other embodiments of this application, the terminal device 200 may include more or fewer components than those shown in the figure, or combine some components, or split some components, or have different component arrangements. The components shown in the figure may be implemented by hardware, software, or a combination of software and hardware.

A wireless communication function of the terminal device 200 may be implemented through the antenna 1, the antenna 2, the mobile communications module 250, the wireless communications module 260, a modem processor, a baseband processor, and the like. The antenna 1 and the antenna 2 are configured to transmit and receive electromagnetic wave signals. The mobile communications module 250 may provide a wireless communication solution that includes 2G/3G/4G/5G or the like and that is applied to the terminal device 200. The mobile communications module 250 may include at least one filter, a switch, a power amplifier, a low noise amplifier (LNA), and the like. The mobile communications module 250 may perform processing such as filtering or amplification on an electromagnetic wave received through the antenna 1, and transfer a processed signal to the modem processor for demodulation. The mobile communications module 250 may further perform processing such as amplification on a signal modulated by the modem processor, and may convert, through the antenna 1, the signal processed by the mobile communications module 250 into an electromagnetic wave for radiation.

Figure 4:
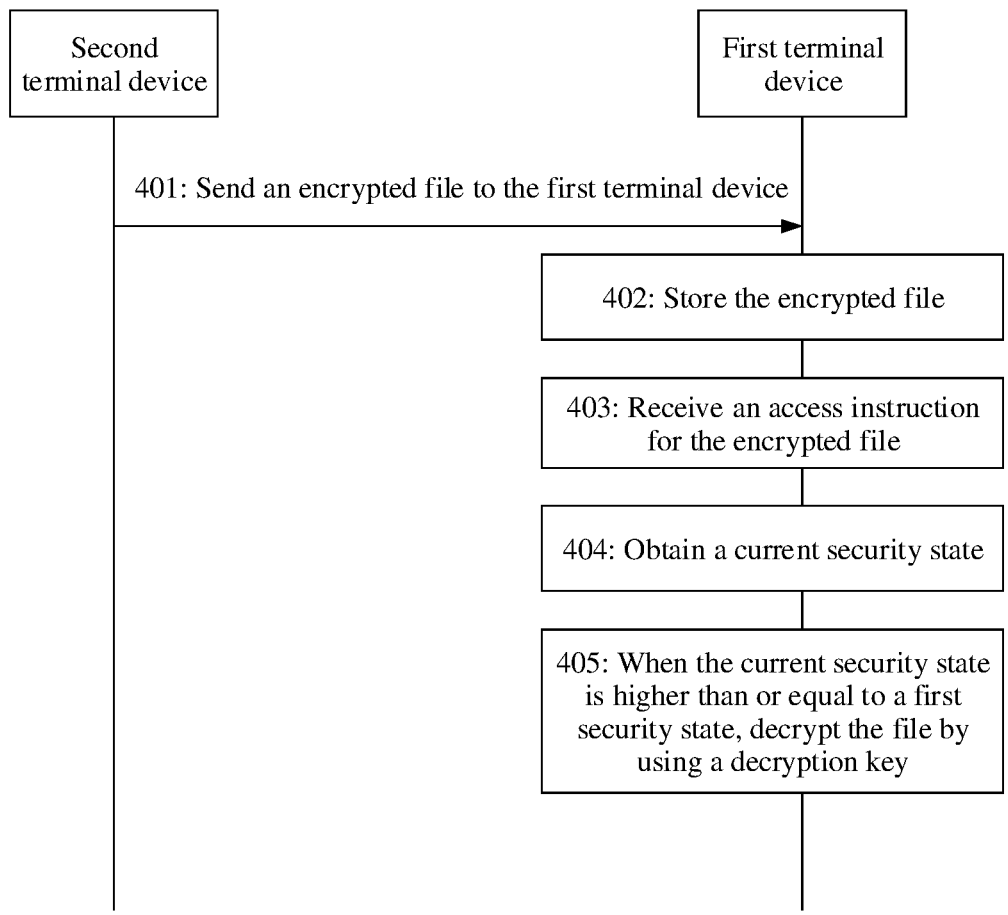
FIG. 4 is an example schematic flowchart of a file processing method according to an embodiment of the present technology.

When the terminal device 200 is the first terminal device, the terminal device 200 may perform sending and receiving operations of a first terminal device in the following method implementations through the antenna 1 and the mobile communications module 250. For example, as shown in FIG. 4, the terminal device 200 may receive an encrypted file from a second terminal device through the antenna 1 and the mobile communications module 240. The terminal device 200 may further perform other sending and receiving operations of the first terminal device in the following method implementations through the antenna 1 and the mobile communications module 240. Similarly, when the terminal device 200 is the second terminal device, the terminal device 200 may alternatively perform sending and receiving operations of a second terminal device in the following method implementations through the antenna 1 and the mobile communications module 250.

The wireless communications module 260 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the terminal device 200. The wireless communications module 260 receives an electromagnetic wave through the antenna 2, performs frequency modulation and filtering processing on an electromagnetic wave signal, and sends a processed signal to the processor 210. The wireless communications module 260 may further receive a to-be-sent signal from the processor 210, perform frequency modulation and amplification on the signal, and convert the signal into an electromagnetic wave for radiation through the antenna 2.

When the terminal device 200 is the first terminal device, the terminal device 200 may perform sending and receiving operations of a first terminal device in the following method implementations through the antenna 2 and the wireless communications module 260. When the terminal device 200 is the second terminal device, the terminal device 200 may alternatively perform sending and receiving operations of a second terminal device in the following method implementations through the antenna 2 and the wireless communications module 260.

The display 294 is configured to display an image, a video, and the like. The display 294 includes a display panel. The display panel may be a liquid crystal display (LCD), an organic light-emitting diode (OLED), an active-matrix organic light emitting diode (AMOLED), a flexible light-emitting diode (FLED), a mini LED, a micro LED, a micro OLED, quantum dot light emitting diodes (QLED), or the like.

When the terminal device 200 is the first terminal device, the first terminal device may implement a display function of a first terminal device in the following method implementations through the display 294. For example, the terminal device 200 may display a file list through the display 294. If a current security state of the terminal device 200 is higher than or equal to a first security state, the terminal device 200 may display content of a decrypted file through the display 294. If the current security state of the terminal device 200 is lower than the first security state, the terminal device 200 may prompt, through the display 294, that a file cannot be accessed and prompt for a reason why the file cannot be accessed. The terminal device 200 may display a security configuration function button through the display 294. The terminal device 200 may prompt, through the display 294, that the second terminal device cancels sending of the file, and display a reason why the second terminal device cancels sending of the file, or display a security configuration suggestion.

When the terminal device 200 is the second terminal device, the terminal device 200 may implement a display function of a second terminal device in the following method implementations through the display 294. For example, the terminal device 200 may display a file list through the display 294. The terminal device 200 may display a user list and the file list through the display 294. The terminal device 200 may display the file list and a file sending mode through the display 294. The terminal device 200 may prompt for a security state of the first terminal device through the display 294, and prompt whether the terminal device 200 is allowed to send a file to the first terminal device. The terminal device 200 may display, through the display 294, a reason option for canceling sending of the file to the first terminal device.

The external memory interface 220 may be configured to connect to an external storage card, for example, a micro SD card, to extend a storage capability of the terminal device 200. The external storage card communicates with the processor 210 through the external memory interface 220, to implement a data storage function. For example, files such as music, a video, and a document are stored in the external storage card.

The internal memory 221 may be configured to store computer executable program code, where the executable program code includes an instruction. The internal memory 221 may include a program storage area and a data storage area. The program storage area may store an operating system, an application required by at least one function (for example, a sound playing function or an image playing function), and the like. The data storage area may store data (for example, audio data or a phone book) created in a use process of the terminal device 200, and the like. In addition, the internal memory 221 may include a high-speed random access memory, and may further include a nonvolatile memory, for example, at least one magnetic disk storage device, a flash memory device, or a universal flash storage (UFS). The processor 210 runs the instruction stored in the internal memory 221 and/or the instruction stored in the memory disposed in the processor, to perform various function applications of the terminal device 200 and data processing.

The processor 210 may include one or more processing units. For example, the processor 210 may include an application processor (AP), a modem processor, a graphics processing unit (GPU), an image signal processor (ISP), a controller, a video codec, a digital signal processor (DSP), a baseband processor, and/or a neural network processing unit (NPU). Different processing units may be independent components, or may be integrated into one or more processors.

When the terminal device 200 is the first terminal device, the processor 210 runs the instruction stored in the internal memory 230 and/or the instruction stored in the memory disposed in the processor, to perform various function applications of a first terminal device and data processing in the following method implementations. When the terminal device 200 is the second terminal device, the processor 210 runs the instruction stored in the internal memory 230 and/or the instruction stored in the memory disposed in the processor, to perform various function applications of a second terminal device and data processing in the following method implementations.

The USB interface 230 is an interface that conforms to a USB standard specification, and may be specifically a mini USB interface, a micro USB interface, a USB Type-C interface, or the like.

The charging management module 240 is configured to receive charging input from a charger. The power management module 241 is configured to connect the battery 242 and the charging management module 240 to the processor 210. The power management module 241 receives input of the battery 242 and/or the charging management module 240, and supplies power to the processor 210, the internal memory 221, the display 294, the camera 293, the wireless communications module 260, and the like.

The camera 293 is configured to capture a static image or a video.

The audio module 270 is configured to convert digital audio information into an analog audio signal for output, and is also configured to convert analog audio input into a digital audio signal. The speaker 270A, also referred to as a "horn," is configured to convert an audio electrical signal into a sound signal. The terminal device 200 may listen to music or answer a call in a hands-free mode over the speaker 270A. The receiver 270B, also referred to as an "earpiece," is configured to convert an audio electrical signal into a sound signal. The microphone 270C, also referred to as a "mike" or a "microphone," is configured to convert a sound signal into an electrical signal. The headset jack 270D is configured to connect to a wired headset.

The sensor module 280 may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

The button 290 includes a power button, a volume button, and the like. The button 290 may be a mechanical button, or may be a touch button. The terminal device 200 may receive button input, and generate button signal input related to a user setting and function control of the terminal device 200.

The motor 291 may generate a vibration prompt. The indicator 292 may be an indicator light, and may be configured to indicate a charging status and a power change, or may be configured to indicate a message, a missed call, a notification, and the like. The SIM card interface 295 is configured to connect to a SIM card.

The following describes a software system of the terminal device 200 in detail.

The software system of the terminal device 200 may use a layered architecture, an event-driven architecture, a microkernel architecture, a micro service architecture, or a cloud architecture. In this embodiment of the present technology, an Android system with the layered architecture is used as an example to describe a software structure of the terminal device 200. FIG. 3 is a block diagram of a software structure of the terminal device 200 according to an embodiment of the present technology. In the layered architecture, software is divided into several layers, and each layer has a clear role and task. The layers communicate with each other through a software interface. In some embodiments, the Android system is divided into five layers, namely, an application layer, an application framework layer, an Android runtime and system library, a kernel layer, and a secure operating system layer from top to bottom.

The application layer may include a series of application packages. As shown in FIG. 3, the application packages may include applications such as Camera, File sharing, Antivirus, Gallery, Phone, Navigation, WLAN, Bluetooth, Music, Videos, and Messages.

The application framework layer provides an application programming interface (API) and a programming framework for an application at the application layer. The application framework layer includes some predefined functions. As shown in FIG. 3, the application framework layer may include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like. The content provider is configured to store and obtain data, and enable the data to be accessed by an application. The data may include a video, an image, audio, calls that are made and received, a browsing history and a bookmark, a phone book, and the like. The view system includes visual controls such as a control for displaying a text and a control for displaying a picture. The view system may be configured to construct an application. A display interface may include one or more views. For example, a display interface including a Messages notification icon may include a text display view and a picture display view. The phone manager is configured to provide a communication function of the terminal device 200, for example, management of a call status (including answering or declining). The resource manager provides various resources for an application, such as a localized character string, an icon, a picture, a layout file, and a video file. The notification manager enables an application to display notification information in a status bar, and may be configured to convey a notification message. The notification manager may automatically disappear after a short pause without requiring a user interaction. For example, the notification manager is configured to notify download completion, give a message notification, and the like.

The Android runtime includes a kernel library and a virtual machine. The Android runtime is responsible for scheduling and management of the Android system. The kernel library includes two parts: a function that needs to be invoked in java language and a kernel library of Android. The application layer and the application framework layer run on the virtual machine. The virtual machine executes java files at the application layer and the application framework layer as binary files. The virtual machine is configured to perform functions such as object lifecycle management, stack management, thread management, security and exception management, and garbage collection.

The system library may include a plurality of function modules, for example, a surface manager, a media library, a three-dimensional graphics processing library (for example, OpenGL ES), and a 2D graphics engine (for example, SGL). The surface manager is configured to manage a display subsystem and provide fusion of 2D and 3D layers for a plurality of applications. The media library supports playback and recording of a plurality of commonly used audio and video formats, static image files, and the like. The media library may support a plurality of audio and video coding formats such as MPEG-4, H.264, MP3, AAC, AMR, JPG, and PNG. The three-dimensional graphics processing library is configured to implement three-dimensional graphics drawing, image rendering, composition, layer processing, and the like. The 2D graphics engine is a drawing engine for 2D drawing.

The kernel layer is a layer between hardware and software. The kernel layer includes at least a display driver, a camera driver, an audio driver, and a sensor driver.

The secure operating system layer may include a trusted execution environment (TEE), TrustZone, and the like. The TEE is mainly used to verify integrity of a startup process and provide better data protection. A TrustZone technology is a system scope security method for a large quantity of applications on a high-performance computing platform, which include secure payment, digital rights management (DRM), an enterprise service, and a web-based service.

The terminal device 200 further includes a key management module. The key management module may be configured to generate and store a key, and control use of the key, for example, control a condition under which the key can be used. A location of the key management module may be in a plurality of forms, and is not limited in this solution. For example, the key management module may be a system service module in the TEE or TrustZone, or may be a system service at the application framework layer, the system library, or the kernel layer, or may be a submodule that is at the application layer and that is included in File sharing.

The following further describes a file processing method provided in the embodiments of this application.

FIG. 4 is a schematic flowchart of a file processing method according to an embodiment of this application. As shown in FIG. 4, the file processing method includes step 401 to step 405.

401: A second terminal device sends an encrypted file to a first terminal device.

The file may include files such as a document, a picture file, or a music file in the second terminal device. Before sending the file to the first terminal device, the second terminal device needs to encrypt the file by using an encryption key. Optionally, the second terminal device may encrypt the file by using a symmetric encryption algorithm, or the second terminal device may encrypt the file by using an asymmetric encryption algorithm. For the symmetric encryption algorithm, an encryption key is the same as a decryption key. For the asymmetric encryption algorithm, an encryption key is different from a decryption key. For example, the encryption key for the asymmetric encryption algorithm is a public key of the first terminal device, and the decryption key for the asymmetric encryption algorithm is a private key of the first terminal device.

402: The first terminal device stores the encrypted file.

In this embodiment of this application, after receiving the encrypted file from the second terminal device, the first terminal device stores the encrypted file.

403: The first terminal device receives an access instruction for the encrypted file.

In this embodiment of this application, after storing the encrypted file, the first terminal device may receive the access instruction for the encrypted file.

The access instruction may be entered by a user, or may be input through an application. This is not limited in this embodiment of this application. For example, the user may tap or double-tap an icon of a file to enter an access instruction for the file.

404: The first terminal device obtains a current security state.

In this embodiment of this application, after the first terminal device receives the access instruction for the encrypted file, the first terminal device obtains the current security state.

The security state may be indicated by using a security attribute value set. That the first terminal device obtains a current security state may be include obtaining a current security attribute value set. The security attribute value set includes values of one or more security attributes. For example, the security attribute may include one or more of the following: an attribute indicating whether a screen lock password is set, an attribute indicating whether the first terminal device is rooted, an attribute indicating whether antivirus software is enabled, an attribute indicating a quantity of viruses prevented by antivirus software, or an attribute indicating whether a security system is entered. The value of the security attribute may be a Boolean (e.g., bool) value or a numeric value. For example, a value of the security attribute indicating whether the screen lock password is set is 1 or 0. The value 1 indicates that the screen lock password is set. The value 0 indicates that the screen lock password is not set. A value of the security attribute indicating whether the first terminal device is rooted is 1 or 0. The value 1 indicates that the first terminal device is rooted. The value 0 indicates that the first terminal device is not rooted. A value of the security attribute indicating whether the antivirus software is enabled is 1 or 0. The value 1 indicates that the antivirus software is enabled. The value 0 indicates that the antivirus software is disabled. A value of the security attribute indicating the quantity of viruses prevented by the antivirus software is 100, indicating that 100 types of viruses can be prevented. A value of the security attribute indicating whether the security system is entered is 1 or 0. The value 1 indicates that the security system is entered. The value 0 indicates that the security system is not entered. The security attribute set may be manually configured by the user, may be preset before delivery of the first terminal device, or may be dynamically configured by using a server. This is not limited in this embodiment of this application. Optionally, the security attribute set of the first terminal device may alternatively be updated by using the server.

Alternatively, the security state may be indicated by using a security score or a security level. That the first terminal device obtains a current security state may be include obtaining a current security score or a current security level. For example, the security score may be 100, 90, or 50. The security level may be low, medium, high, or the like. Alternatively, the security state may be indicated by using a combination of a security attribute value set and a security score, or the security state may be indicated by using a combination of a security attribute value set and a security level.

The security score or the security level of the first terminal device may be determined by using the security attribute value set. Alternatively, the security score or the security level of the first terminal device may be determined in another manner. For example, a weight corresponding to each security attribute value may be preset on the first terminal device. The weight is 30 when the attribute indicating whether the screen lock password is set is equal to 1. The weight is 0 when the attribute indicating whether the screen lock password is set is equal to 0. The weight is 50 when the attribute indicating whether the first terminal device is rooted is equal to 0. The weight is 0 when the attribute indicating whether the first terminal device is rooted is equal to 1. The weight is 20 when the attribute indicating whether the antivirus software is enabled is equal to 1. The weight is 0 when the attribute indicating whether the antivirus software is enabled is equal to 0. If the current security attribute value set is {value of the attribute indicating whether the screen lock password is set is equal to 1, value of the attribute indicating whether the first terminal device is rooted is equal to 0, value of the attribute indicating whether the antivirus software is enabled is equal to 0}, the current security score is 80, namely, 30+50+0. For another example, a score interval corresponding to each security level may alternatively be preset. For example, a security level corresponding to scores 0 to 59 is low, a security level corresponding to scores 60 to 79 is medium, and a security level corresponding to scores 80 to 100 is high. If the current security score is 80, the current security level is high. Certainly, the security level or the security score may alternatively be determined in another manner. This is not limited in this embodiment of this application.

405: When the current security state is higher than or equal to a first security state, the first terminal device decrypts the file by using a decryption key.

In this embodiment of this application, after obtaining the current security state, the first terminal device determines whether the current security state is higher than or equal to the first security state. When the current security state is higher than or equal to the first security state, the first terminal device decrypts the file by using the decryption key. Optionally, when the current security state is lower than the first security state, the first terminal device prompts that the file cannot be accessed and prompts for a reason why the file cannot be accessed.

It may be understood that when the current security state is higher than or equal to the first security state, the first terminal device decrypts the file by using the decryption key in the following two manners: Manner 1: When the first terminal device determines that the current security state is higher than or equal to the first security state, the first terminal device is triggered to decrypt the file by using the decryption key. Manner 2: The first terminal device decrypts the file by using the decryption key within a period of time after the first terminal device determines that the current security state is higher than or equal to the first security state.

The first security state may be a preset security state, for example, may be customized by the user in advance, or may be configured before delivery of the device. Alternatively, the first security state may be a security state corresponding to the decryption key of the file.

If the first security state is the preset security state, the first terminal device may first determine whether the current security state is higher than or equal to the first security state. When determining that the current security state is higher than or equal to the first security state, the first terminal device obtains the decryption key, and then decrypts the file by using the decryption key. Alternatively, the first terminal device may obtain the decryption key after receiving the access instruction for the encrypted file and before determining whether the current security state is higher than or equal to the first security state.

If the first security state is the security state corresponding to the decryption key of the file, after the first terminal device receives the access instruction for the encrypted file, the first terminal device may first obtain the current security state and the decryption key corresponding to the file. A sequence of obtaining the decryption key and the current security state is not limited. After obtaining the decryption key, the first terminal device may obtain the first security state corresponding to the decryption key. After obtaining the current security state and the first security state, the first terminal device determines whether the current security state is higher than or equal to the first security state. When determining that the current security state is higher than or equal to the first security state, the first terminal device decrypts the file by using the decryption key.

Specifically, a key management module of the first terminal device may determine whether the current security state is higher than or equal to the first security state, and the key management module obtains the decryption key.

The first security state may be indicated by using a first security attribute value set, may be indicated by using a first security score, or may be indicated by using a first security level. Alternatively, the first security state may be indicated by using a combination of a first security attribute value set and a first security score, or the first security state may be indicated by using a combination of a first security attribute value set and a first security level.

The following describes a specific implementation in which when the current security state is indicated by using the security attribute value set, and the first security state is indicated by using the first security attribute value set, the first terminal device determines whether the current security state is higher than or equal to the first security state.

Manner 1: The first terminal device calculates a security score corresponding to the current security attribute value set and a security score corresponding to the first security attribute value set. If the security score corresponding to the current security attribute value set is greater than or equal to the security score corresponding to the first security attribute value set, the first terminal device determines that the current security state is higher than or equal to the first security state; or if the security score corresponding to the current security attribute value set is less than the security score corresponding to the first security attribute value set, the first terminal device determines that the current security state is lower than the first security state.

For example, the current security attribute value set is {value of the attribute indicating whether the screen lock password is set is equal to 1, value of the attribute indicating whether the first terminal device is rooted is equal to 0, value of the attribute indicating whether the antivirus software is enabled is equal to 1}; and the first security attribute value set is {value of the attribute indicating whether the screen lock password is set is equal to 1, value of the attribute indicating whether the first terminal device is rooted is equal to 0, value of the attribute indicating whether the antivirus software is enabled is equal to 0}. A weight corresponding to each security attribute value may be preset on the first terminal device. For example, the weight is 30 when the attribute indicating whether the screen lock password is set is equal to 1. The weight is 0 when the attribute indicating whether the screen lock password is set is equal to 0. The weight is 50 when the attribute indicating whether the first terminal device is rooted is equal to 0. The weight is 0 when the attribute indicating whether the first terminal device is rooted is equal to 1. The weight is 20 when the attribute indicating whether the antivirus software is enabled is equal to 1. The weight is 0 when the attribute indicating whether the antivirus software is enabled is equal to 0. Because the current security attribute value set is {value of the attribute indicating whether the screen lock password is set is equal to 1, value of the attribute indicating whether the first terminal device is rooted is equal to 0, value of the attribute indicating whether the antivirus software is enabled is equal to 1}, the security score corresponding to the current security attribute value set is 100, that is, 30+50+20. Because the first security attribute value set is {value of the attribute indicating whether the screen lock password is set is equal to 1, value of the attribute indicating whether the first terminal device is rooted is equal to 0, value of the attribute indicating whether the antivirus software is enabled is equal to 0}, the security score corresponding to the first security attribute value set is 80, that is, 30+50+0. Therefore, the first terminal device determines that the current security state is higher than the first security state. In this case, the first terminal device decrypts the file by using the decryption key.

Manner 2: The first terminal device determines whether the current security attribute value set matches the first security attribute value set. If the current security attribute value set matches the first security attribute value set, the first terminal device determines that the current security state is equal to the first security state; or if the current security attribute value set does not match the first security attribute value set, the first terminal device determines that the current security state is lower than the first security state.

For example, the first security attribute value set is {value of the attribute indicating whether the screen lock password is set is equal to 1, value of the attribute indicating whether the first terminal device is rooted is equal to 0, value of the attribute indicating whether the antivirus software is enabled is equal to 1}. The current security attribute value set is {value of the attribute indicating whether the screen lock password is set is equal to 0, value of the attribute indicating whether the first terminal device is rooted is equal to 0, value of the attribute indicating whether the antivirus software is enabled is equal to 0}. Values of the attributes indicating whether the screen lock password is set that are in the two sets do not match, and values of the attributes indicating whether the antivirus software is enabled that are in the two sets do not match. Therefore, the first terminal device determines that the current security state is lower than the first security state. In this case, the first terminal device does not decrypt the file by using the decryption key.

The following describes a specific implementation in which when the current security state is indicated by using the security score, and the first security state is indicated by using the first security score, the first terminal device determines whether the current security state is higher than or equal to the first security state.

The first terminal device determines whether the current security score is greater than or equal to the first security score. If the current security score is greater than or equal to the first security score, the first terminal device determines that the current security state is higher than or equal to the first security state; or if the current security score is less than the first security score, the first terminal device determines that the current security state is lower than the first security state.

For example, if the current security score is 60, and the first security score is 80, the first terminal device determines that the current security score is less than the first security score. In this case, the first terminal device does not decrypt the file by using the decryption key. If the current security score is 90, and the first security score is 80, the first terminal device determines that the current security score is greater than the first security score. In this case, the first terminal device decrypts the file by using the decryption key.

The following describes a specific implementation in which when the current security state is indicated by using the security level, and the first security state is indicated by using the first security level, the first terminal device determines whether the current security state is higher than or equal to the first security state.

The first terminal device determines whether the current security level is higher than or equal to the first security level. If the current security level is higher than or equal to the first security level, the first terminal device determines that the current security state is higher than or equal to the first security state; or if the current security level is lower than the first security level, the first terminal device determines that the current security state is lower than the first security state.

For example, if the current security level is low, and the first security level is high, the first terminal device determines that the current security level is lower than the first security level. In this case, the first terminal device does not decrypt the file by using the decryption key. If the current security level is high, and the first security level is medium, the first terminal device determines that the current security level is higher than the first security level. In this case, the first terminal device decrypts the file by using the decryption key.

Optionally, after decrypting the file by using the decryption key, the first terminal device may specifically display the decrypted file. Alternatively, if an application requests to access the file, the first terminal device may send the decrypted file to the application that initiates the request.

It should be noted that the file is decrypted through step 403 to step 405 each time the file is accessed. If the file only needs to be decrypted during a first access, but does not need to be decrypted during subsequent access, security of the file on the first terminal device still cannot be ensured during the subsequent access. Therefore, the file needs to be decrypted through step 403 to step 405 each time the file is accessed.

The following further describes principles of step 401 to step 405 with reference to specific application scenarios.

Figure 5:
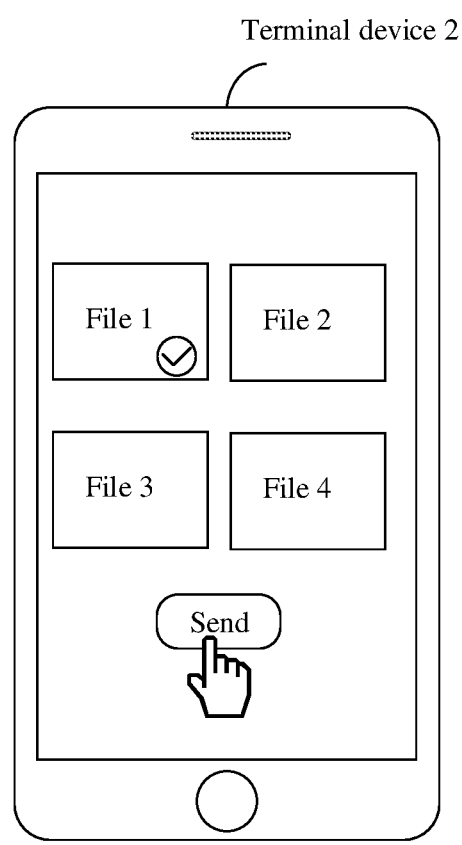
FIG. 5 is an example schematic diagram of an interface of a terminal device according to an embodiment of the present technology.

For example, the second terminal device is a terminal device 2, and the first terminal device is a terminal device 1. As shown in FIG. 5, a user 1 may select, on the terminal device 2, a file 1 that needs to be sent to the terminal device 1. After the user 1 selects the file 1 and taps a send button, the terminal device 2 may encrypt the file 1 by using an encryption key. After encrypting the file 1, the terminal device 2 sends the encrypted file 1 to the terminal device 1. After receiving the encrypted file 1, the terminal device 1 stores the file 1.

Figure 6:
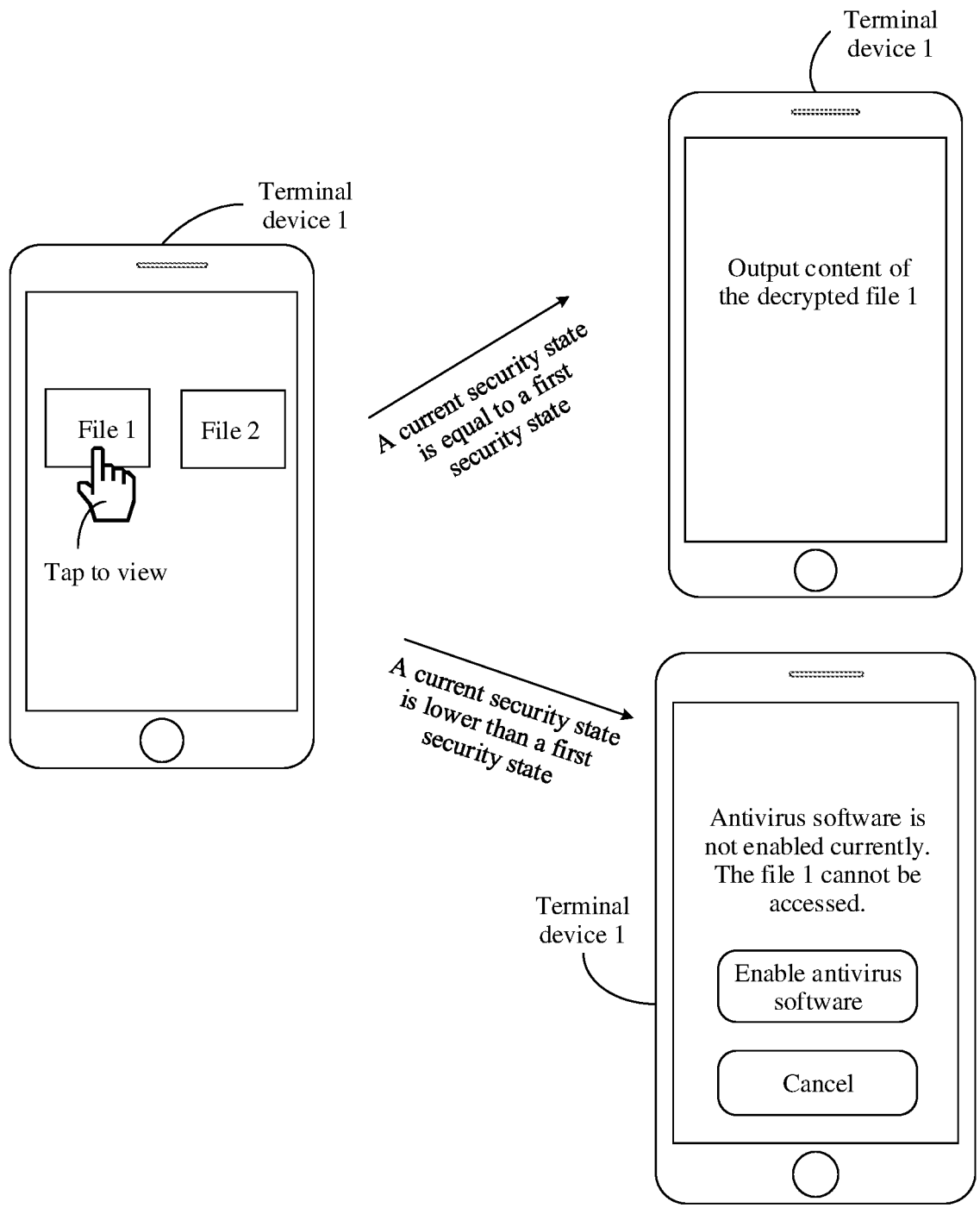
FIG. 6 is an example schematic diagram of an interface of a terminal device according to an embodiment of the present technology.

As shown in FIG. 6, subsequently, when a user 2 of the terminal device 1 needs to view content of the file 1, the user 2 may tap an icon of the file 1 on the terminal device 1, to enter an access instruction for the file 1. After receiving the access instruction, the terminal device 1 obtains a current security attribute value set. The current security attribute value set is {value of an attribute indicating whether a screen lock password is set is equal to 1, value of an attribute indicating whether the first terminal device is rooted is equal to 0, value of an attribute indicating whether antivirus software is enabled is equal to 0}. The terminal device 1 determines whether a security state indicated by the current security attribute value set is higher than or equal to a first security state indicated by a first security attribute value set. If the security state indicated by the current security attribute value set is higher than or equal to the first security state indicated by the first security attribute value set, the terminal device 1 decrypts the file 1 by using a decryption key of the file 1. If the security state indicated by the current security attribute value set is lower than the first security state indicated by the first security attribute value set, the terminal device 1 prompts that the file 1 cannot be accessed and prompts for a reason why the file 1 cannot be accessed. For example, as shown in FIG. 6, when the first security attribute value set is {value of an attribute indicating whether a screen lock password is set is equal to 1, value of an attribute indicating whether the first terminal device is rooted is equal to 0, value of an attribute indicating whether antivirus software is enabled is equal to 0}, the security state indicated by the current security attribute value set is equal to the first security state indicated by the first security attribute value set. Therefore, the terminal device 1 decrypts the file 1, and outputs content of the decrypted file 1. When the first security attribute value set is {value of an attribute indicating whether a screen lock password is set is equal to 1, value of an attribute indicating whether the first terminal device is rooted is equal to 0, value of an attribute indicating whether antivirus software is enabled is equal to 1}, the security state indicated by the current security attribute value set is lower than the security state indicated by the first security attribute value set. Therefore, the terminal device 1 may output prompt information shown in FIG. 6. Optionally, the terminal device 1 may further output a security configuration function button based on the current security attribute value set and the first security attribute value set, and the user may tap the security configuration function button to perform corresponding security configuration. For example, as shown in FIG. 6, because antivirus software is not enabled currently, the terminal device 1 may output a function button used to enable the antivirus software. After the user taps the function button, the terminal device 1 may enable the antivirus software. Alternatively, the user may tap a cancel button, so that the terminal device 1 can exit a current interface.

It can be learned that the method described in FIG. 4 helps improve security of the file on the first terminal device.

Figure 7:
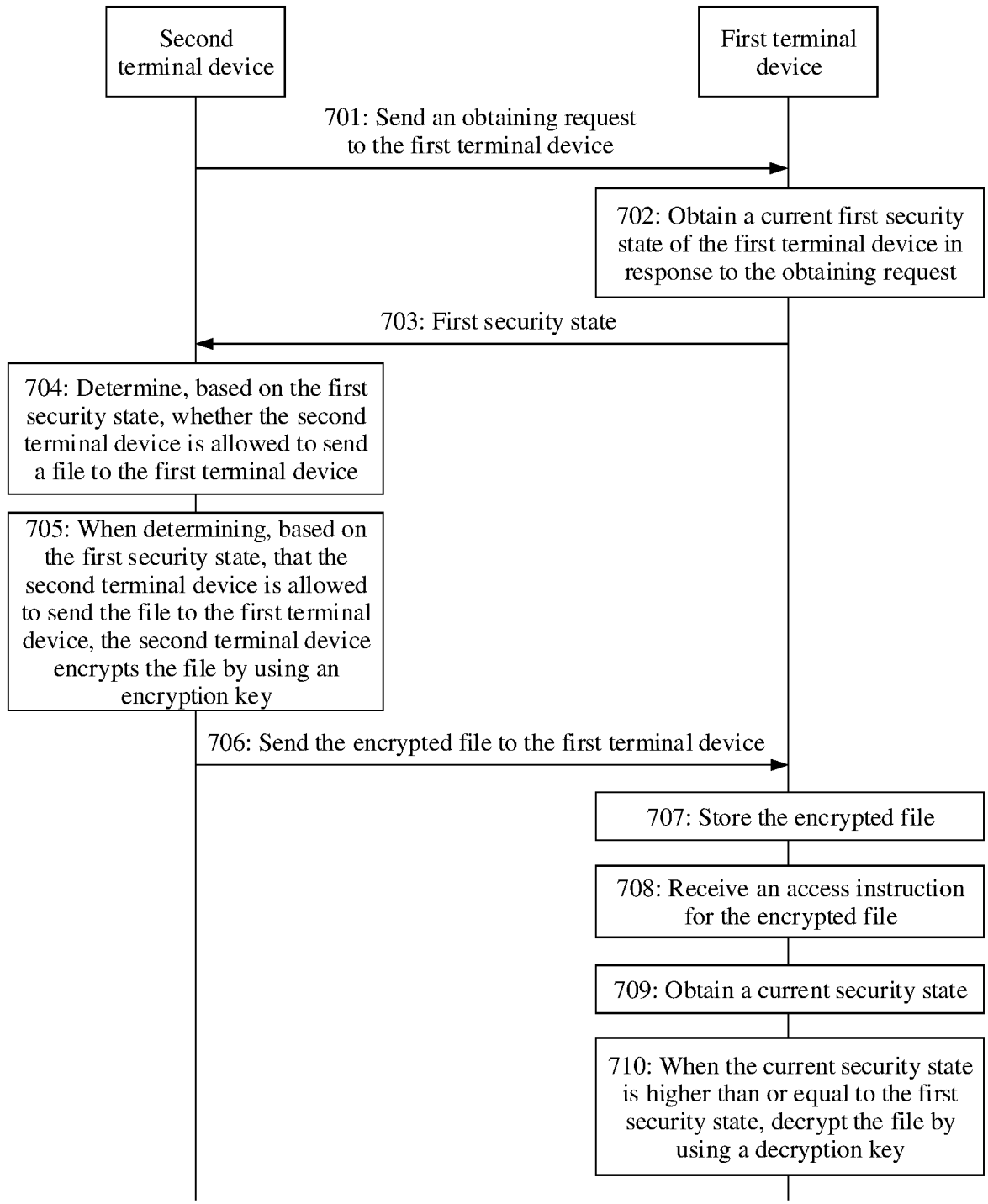
FIG. 7 is an example schematic flowchart of another file processing method according to an embodiment of the present technology.

FIG. 7 is a schematic flowchart of a file processing method according to an embodiment of this application. As shown in FIG. 7, the file processing method includes step 701 to step 710.

701: A second terminal device sends an obtaining request to a first terminal device.

In this embodiment of this application, the second terminal device is triggered, in the following manners, to send the obtaining request to the first terminal device.

Manner 1: After detecting that a user selects a file that needs to be sent and taps a send button, the second terminal device may be trigger to send the obtaining request to the first terminal device. For example, as shown in FIG. 5, the second terminal device is a terminal device 2, and the first terminal device is a terminal device 1. A user 1 may select, on the terminal device 2, a file 1 that needs to be sent to the terminal device 1. After the user 1 selects the file 1 and taps a send button, the terminal device 2 sends the obtaining request to the terminal device 1.

Figure 8:
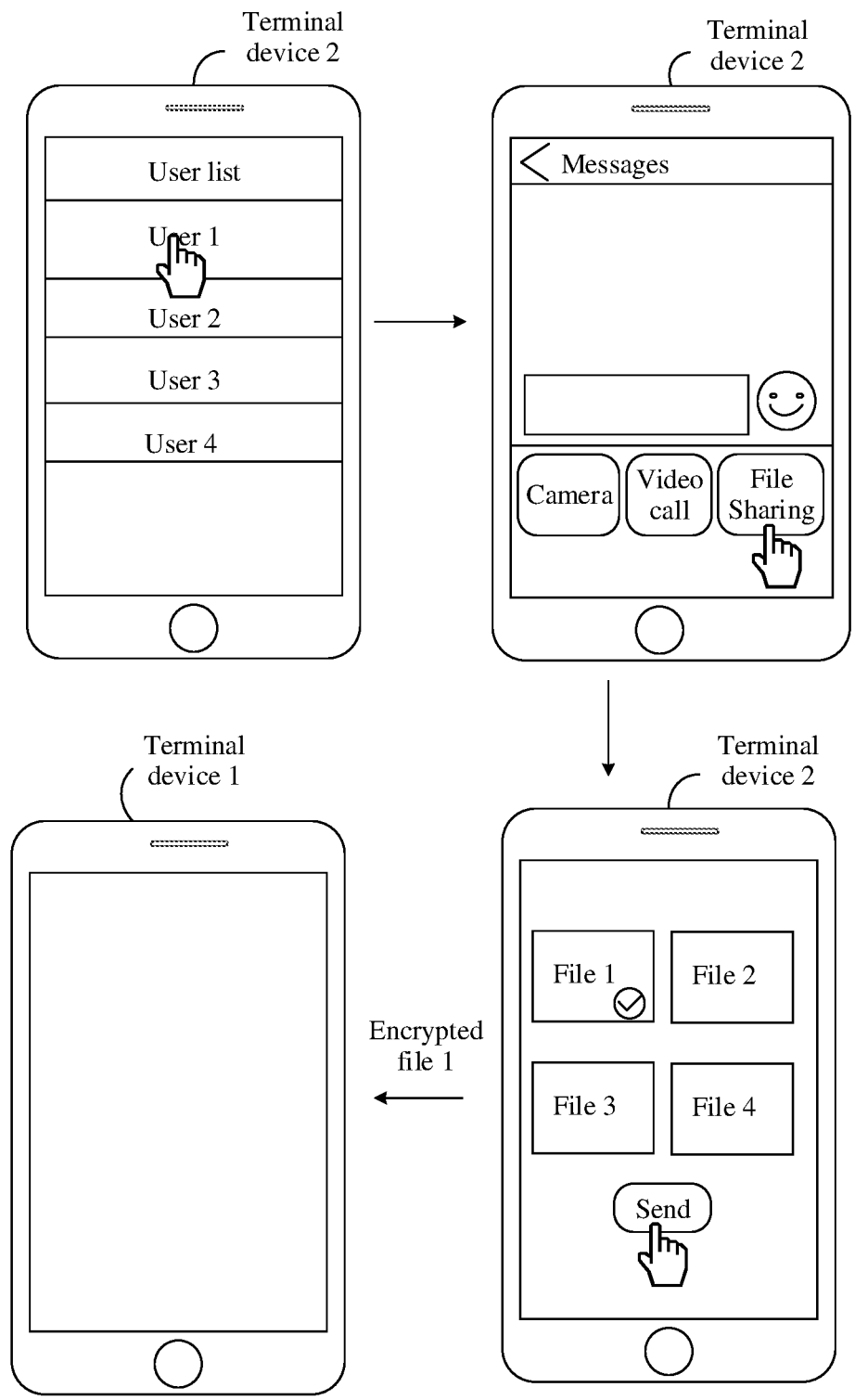
FIG. 8 is an example schematic diagram of an interface of a terminal device according to an embodiment of the present technology.

Manner 2: When detecting that the user selects a user corresponding to the first terminal device from a user list, the second terminal device may send the obtaining request to the first terminal device. For example, the second terminal device is a terminal device 2, and the first terminal device is a terminal device 1. As shown in FIG. 8, the terminal device 2 may obtain a user list from a server of File sharing, for example, a user list of an instant messaging application. Each user corresponds to one terminal device. For example, a user 1 corresponds to a terminal device 1, a user 3 corresponds to a terminal device 3, a user 4 corresponds to a terminal device 4, and a user 5 corresponds to a terminal device 5. After the user selects the user 1 from the user list, the terminal device 2 sends an obtaining request to the terminal device 1. After sending the obtaining request to the terminal device 1, the terminal device 2 may receive a first security state fed back by the terminal device 1 in response to the obtaining request. After the user selects the user 1 from the user list, the terminal device 2 enters a dialog interface of the user 1. If the user expects to share a file with the user 1, the user may tap a file sharing button in the dialog interface of the user 1, and the terminal device 2 may output a file list for selection by the user. After the user selects a file 1 and taps a send button, the terminal device 2 may determine, based on the received first security state, whether the terminal device 2 is allowed to send the file 1 to the terminal device 1. If the terminal device 2 may determine, based on the received first security state, that the terminal device 2 is allowed to send the file 1 to the terminal device 1, the terminal device 2 encrypts the file 1 by using an encryption key of the file 1, and sends the encrypted file 1 to the terminal device 1.

Manner 3: The second terminal device receives a data sending instruction used to send a file to the first terminal device. The second terminal device determines whether the file is data of a preset protection type. If the file is the data of the preset protection type, the second terminal device is triggered to send the obtaining request to the first terminal device. In Manner 3, the second terminal device needs to first determine whether a file is a file with a relatively high security requirement. For example, a file of a document type or a picture type has a relatively high security requirement, and a music file has a relatively low security requirement. The preset protection type may be preset by the user, or may be set by a system by default. As shown in FIG. 5, after a user 1 selects a file 1 on the terminal device 2 and taps a send button, the terminal device 2 may determine whether the file 1 is of a document type or a picture type. If the file 1 is of the document type or the picture type, the terminal device 2 sends an obtaining request to the terminal device 1. If the file 1 is a file of a music type, the terminal device 2 may directly send the file 1 to the terminal device 1. Optionally, for same File sharing, different types of files shared by File sharing may have different security requirements. For example, a music file shared by a WeChat application has a relatively low security requirement, and a document file shared by the WeChat application has a relatively high security requirement. Alternatively, for same File sharing, different types of files shared by File sharing may have a same security requirement. Optionally, for same File sharing, a same type of files shared by File sharing may have different security requirements. For example, a picture 1 shared by a WeChat application has a relatively low security requirement, and a picture 2 shared by the WeChat application has a relatively high security requirement. Alternatively, for same File sharing, a same type of files shared by File sharing may have a same security requirement.

Based on Manner 3, the second terminal device can send files with different security requirements in different manners.

Figure 9:
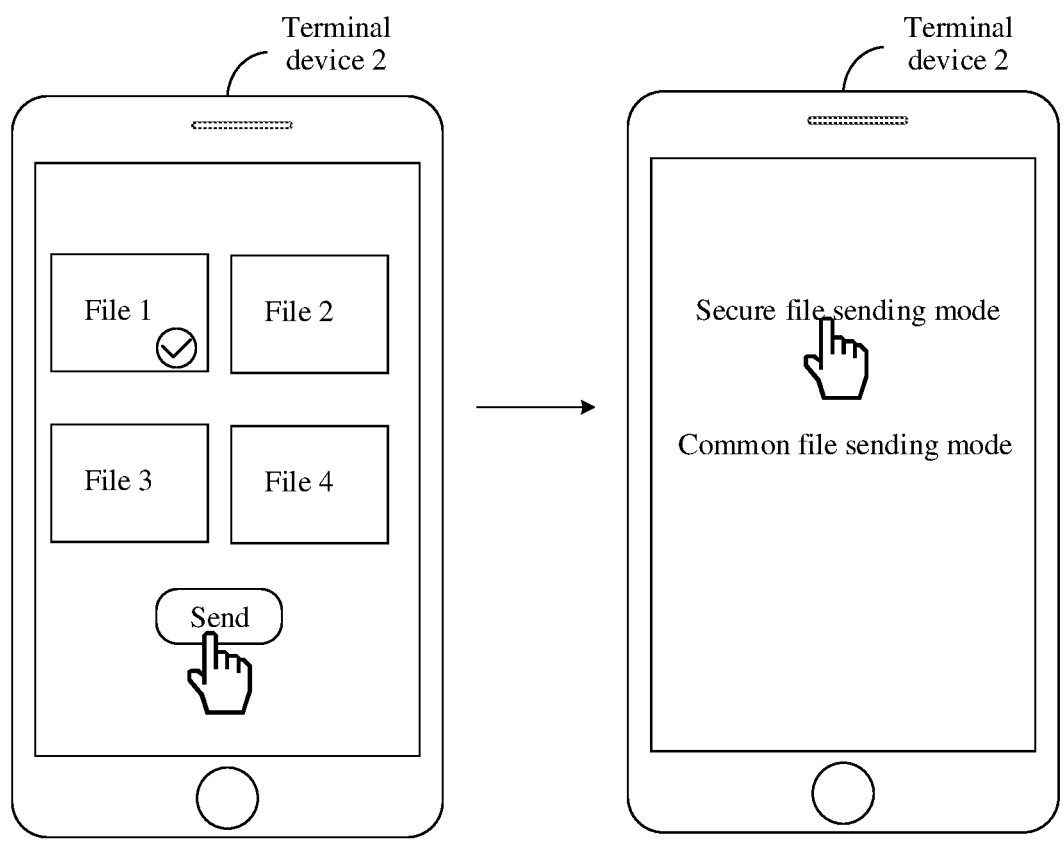
FIG. 9 is an example schematic diagram of an interface of a terminal device according to an embodiment of the present technology.

Manner 4: The second terminal device outputs file sending mode options. The second terminal device receives a selection operation performed by the user on an option of a secure file sending mode in the file sending mode options. The second terminal device enters the secure file sending mode in response to the selection operation. After entering the secure file sending mode, the second terminal device sends the obtaining request to the first terminal device only in the secure file sending mode. For example, as shown in FIG. 9, after a user 1 selects a file 1 on a terminal device 2 and taps a send button, the terminal device 2 may output file sending mode options. As shown in FIG. 9, the file sending mode options include a secure file sending mode and a common file sending mode. If the file 1 is a file with a relatively high security requirement, the user may select the secure file sending mode. After detecting that the user selects the secure file sending mode, the terminal device 2 enters the secure file sending mode, and sends an obtaining request to the terminal device 1 in the secure sending mode. If the file 1 is a file with a relatively low security requirement, the user may select the common file sending mode. After detecting that the user selects the common file sending mode, the terminal device 2 enters the common file sending mode, and the terminal device 2 may directly send the file 1 to the terminal device 1. Based on Manner 4, the second terminal device can flexibly select, based on a user's requirement, different file sending modes to send files.

Certainly, the second terminal device may alternatively be triggered, in another manner, to send the obtaining request to the first terminal device. This is not limited in this embodiment of this application.

702: The first terminal device obtains a current first security state of the first terminal device in response to the obtaining request.

In this embodiment of this application, after receiving the obtaining request from the second terminal device, the first terminal device obtains the current first security state of the first terminal device in response to the obtaining request.

703: The first terminal device sends the first security state to the second terminal device.

In this embodiment of this application, after obtaining the current first security state of the first terminal device, the first terminal device sends the first security state to the second terminal device.

Figure 10:
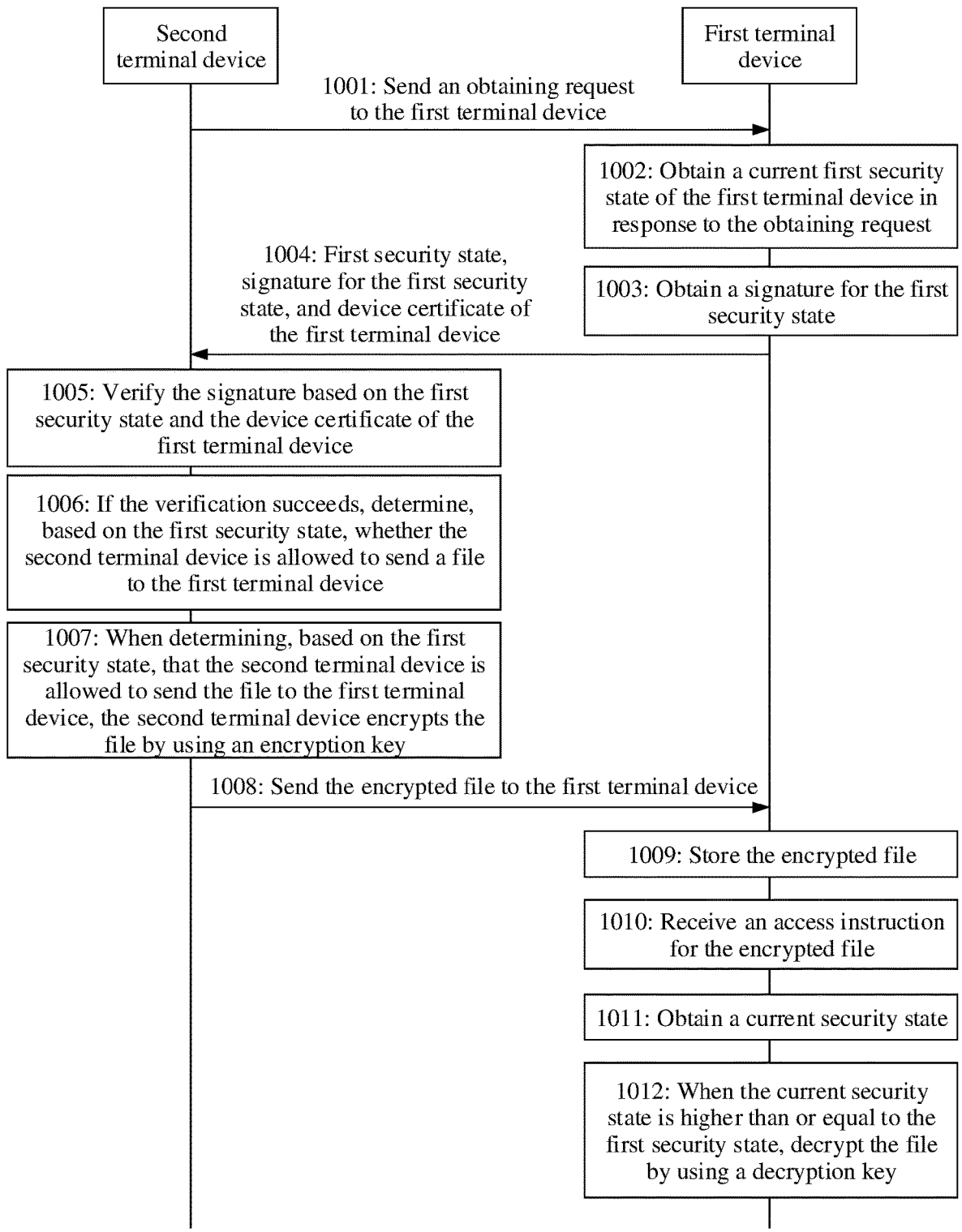
FIG. 10 is an example schematic flowchart of another file processing method according to an embodiment of the present technology.

In an optional implementation, as shown in FIG. 10, after obtaining the current first security state of the first terminal device, the first terminal device further needs to obtain a signature for the first security state. The first terminal device specifically sends the first security state, the signature for the first security state, and a device certificate of the first terminal device to the second terminal device. After receiving the first security state, the signature for the first security state, and the device certificate of the first terminal device, the second terminal device verifies the signature based on the first security state and the device certificate of the first terminal device. If the verification succeeds, it indicates that the first security state is sent by the first terminal device. Therefore, if the verification succeeds, the second terminal device determines, based on the first security state, whether the second terminal device is allowed to send a file to the first terminal device. If the verification fails, it indicates that the first security state is not sent by the first terminal device, and the second terminal device may prompt that the second terminal device has a security risk. In this case, the second terminal device does not send a file to the first terminal device. Based on the optional implementation, the security risk can be identified, to help improve file security.

The first terminal device may generate the signature for the first security state. Alternatively, the first terminal device may send the first security state to a server, and the server generates the signature for the first security state. After generating the signature, the server may send the signature to the first terminal device. The first terminal device may receive the signature from the server.

704: The second terminal device determines, based on the first security state, whether the second terminal device is allowed to send a file to the first terminal device.

In this embodiment of this application, after the second terminal device receives the first security state from the first terminal device, the second terminal device determines, based on the first security state, whether the second terminal device is allowed to send the file to the first terminal device. The second terminal device performs step 705 when determining that the second terminal device is allowed to send the file to the first terminal device.

In an optional implementation, when the second terminal device determines that the second terminal device is not allowed to send the file to the first terminal device, the second terminal device sends prompt information to the first terminal device, where the prompt information is used to prompt for a reason for canceling sending of the file to the first terminal device. After receiving the prompt information, the first terminal device may prompt, based on the prompt information, for a reason for canceling sending of the file to the first terminal device, or prompt the user to perform security configuration based on the prompt information. For a specific implementation principle of the optional implementation, refer to descriptions corresponding to FIG. 12 and FIG. 13.

Optionally, a specific implementation in which when the second terminal device determines that the second terminal device is not allowed to send the file to the first terminal device, the second terminal device sends the prompt information to the first terminal device is as follows: when determining that the second terminal device is not allowed to send the file to the first terminal device, the second terminal device outputs a reason option for canceling sending of the file to the first terminal device. The second terminal device receives a selection operation performed by the user on one reason option. The second terminal device sends the prompt information to the first terminal device, where the prompt information includes a reason for selecting the selection operation. For a specific implementation principle of the implementation, refer to descriptions corresponding to FIG. 14.

705: When the second terminal device determines, based on the first security state, that the second terminal device is allowed to send the file to the first terminal device, the second terminal device encrypts the file by using an encryption key.

It may be understood that when the second terminal device determines, based on the first security state, that the second terminal device is allowed to send the file to the first terminal device, the second terminal device encrypts the file by using the encryption key in the following two manners: Manner 1: When the second terminal device determines, based on the first security state, that the second terminal device is allowed to send the file to the first terminal device, the second terminal device is triggered to encrypt the file by using the encryption key. Manner 2: The second terminal device encrypts the file by using the encryption key within a period of time after the second terminal device determines, based on the first security state, that the second terminal device is allowed to send the file to the first terminal device.

706: The second terminal device sends the encrypted file to the first terminal device.

In this embodiment of this application, after the second terminal device encrypts the file by using the encryption key, the second terminal device sends the encrypted file to the first terminal device.

707: The first terminal device stores the encrypted file.

In this embodiment of this application, after receiving the encrypted file from the second terminal device, the first terminal device stores the encrypted file.

708: The first terminal device receives an access instruction for the encrypted file.

In this embodiment of this application, after storing the encrypted file, the first terminal device may receive the access instruction for the encrypted file.

709: The first terminal device obtains a current security state.

In this embodiment of this application, after receiving the access instruction for the encrypted file, the first terminal device obtains the current security state.

710: When the current security state is higher than or equal to the first security state, the first terminal device decrypts the file by using a decryption key.

In this embodiment of this application, the first security state is a security state corresponding to the decryption key. Each decryption key may correspond to one security state. After receiving the access instruction for the encrypted file, the first terminal device may first obtain the current security state and the decryption key corresponding to the file. A sequence of obtaining the decryption key and the current security state is not limited. After obtaining the decryption key, the first terminal device obtains the first security state based on the decryption key. After obtaining the current security state and the first security state, the first terminal device determines whether the current security state is higher than or equal to the first security state. When determining that the current security state is higher than or equal to the first security state, the first terminal device decrypts the file by using the decryption key.

For specific implementation principles of step 706 to step 710, refer to the specific implementation principles of step 401 to step 405 in FIG. 4.

It can be learned that according to the method described in FIG. 7, the second terminal device can perform security control on the file to be sent to the first terminal device.

In an optional implementation, a specific implementation of step 704 in which the second terminal device determines, based on the first security state, whether the second terminal device is allowed to send the file to the first terminal device is as follows: the second terminal device prompts for a security state of the first terminal device based on the first security state, and prompts whether the second terminal device is allowed to send the file to the first terminal device. When the second terminal device receives a sending allowed operation of the user, the second terminal device determines that the second terminal device is allowed to send the file to the first terminal device. When the second terminal device receives a sending cancelled operation of the user, the second terminal device determines that the second terminal device is not allowed to send the file to the first terminal device. To be specific, in this implementation, the user may manually select whether to send the file. In this way, the sender can flexibly determine whether to send the file to the receiver.

For example, the second terminal device is a terminal device 2, the first terminal device is a terminal device 1, and the first security state is indicated by using a first security attribute value set. After detecting that a user selects a file 1 on the terminal device 2 and taps a send button, the terminal device 2 sends an obtaining request to the terminal device 1. After receiving the obtaining request, the terminal device 1 obtains a current first security attribute value set. The first security attribute value set is {value of an attribute indicating whether a screen lock password is set is equal to 1, value of an attribute indicating whether the first terminal device is rooted is equal to 0, value of an attribute indicating whether antivirus software is enabled is equal to 0, value of an attribute indicating whether a security system is entered is equal to 0}. The terminal device 1 sends the first security attribute value set to the terminal device 2.

Figure 11:
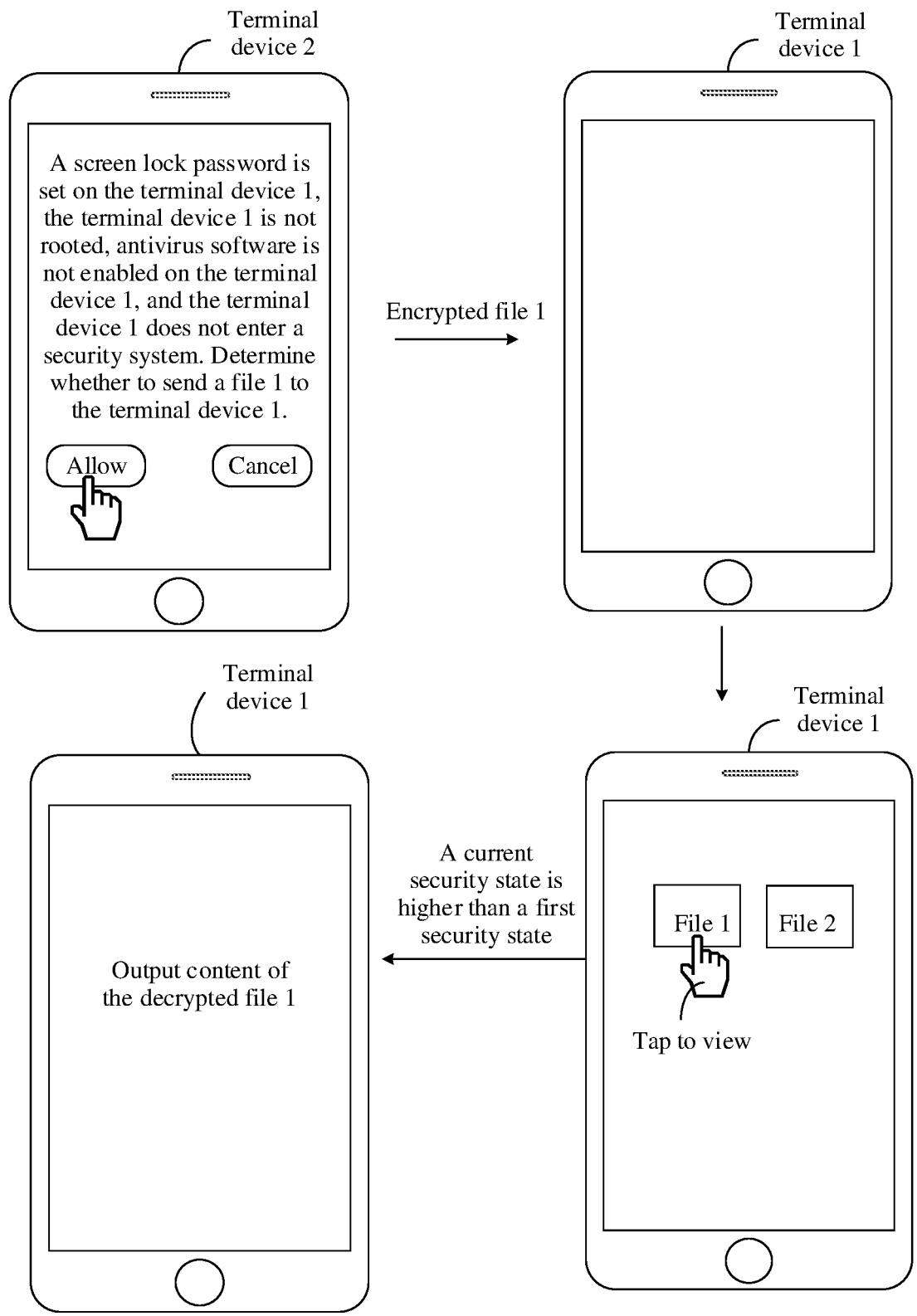
FIG. 11 is an example schematic diagram of an interface of a first terminal device and an interface of a second terminal device according to an embodiment of the present technology.

After the terminal device 2 receives the first security attribute value set, the terminal device 2 prompts for a security state of the terminal device 1 based on the first security attribute value set. As shown in FIG. 11, the terminal device 2 prompts that a screen lock password is set on the terminal device 1, the terminal device 1 is not rooted, antivirus software is not enabled on the terminal device 1, and the terminal device 1 does not enter a security system. The terminal device 2 further prompts whether the second terminal device is allowed to send a file 1 to the terminal device 1. If the user taps a send button, the terminal device 2 determines that the terminal device 2 is allowed to send the file 1 to the terminal device 1, and the terminal device 2 encrypts the file 1 by using an encryption key, and sends the encrypted file 1 to the terminal device 1. After receiving the encrypted file 1, the terminal device 1 stores the encrypted file 1. As shown in FIG. 11, in subsequent time, when a user 2 of the terminal device 1 needs to view content of the file 1, the user 2 may tap an icon of the file 1 on the terminal device 1, to enter an access instruction for the file 1. After receiving the access instruction, the terminal device 1 obtains a current security attribute value set. The current security attribute value set is {value of an attribute indicating whether a screen lock password is set is equal to 1, value of an attribute indicating whether the first terminal device is rooted is equal to 0, value of an attribute indicating whether antivirus software is enabled is equal to 1, value of an attribute indicating whether a security system is entered is equal to 1}. The terminal device 1 determines that a security state indicated by the current security attribute value set is higher than a first security state indicated by the first security attribute value set. Therefore, the terminal device 1 decrypts the file 1 by using a decryption key of the file 1. Optionally, in FIG. 11, the terminal device 2 may also prompt for a security score or a security level of the terminal device 1. The security score or the security level may be obtained through calculation based on the first security attribute value set. Alternatively, when the first security state is indicated by using the first security attribute value set and the security score, in FIG. 11, the terminal device 2 may also prompt for the security score of the terminal device 1. Alternatively, when the first security state is indicated by using the first security attribute value set and the security level, in FIG. 11, the terminal device 2 may also prompt for the security level of the terminal device 1.

Figure 12:
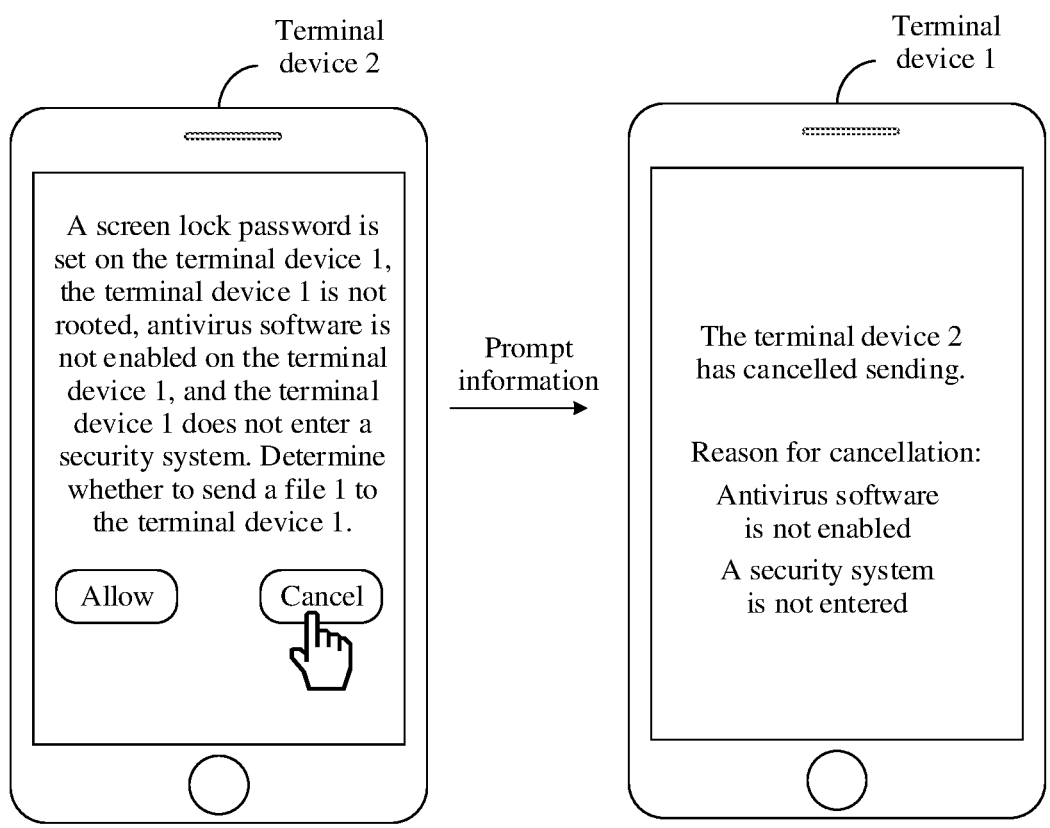
FIG. 12 is an example schematic diagram of an interface of a first terminal device and an interface of a second terminal device according to an embodiment of the present technology.
Figure 13:
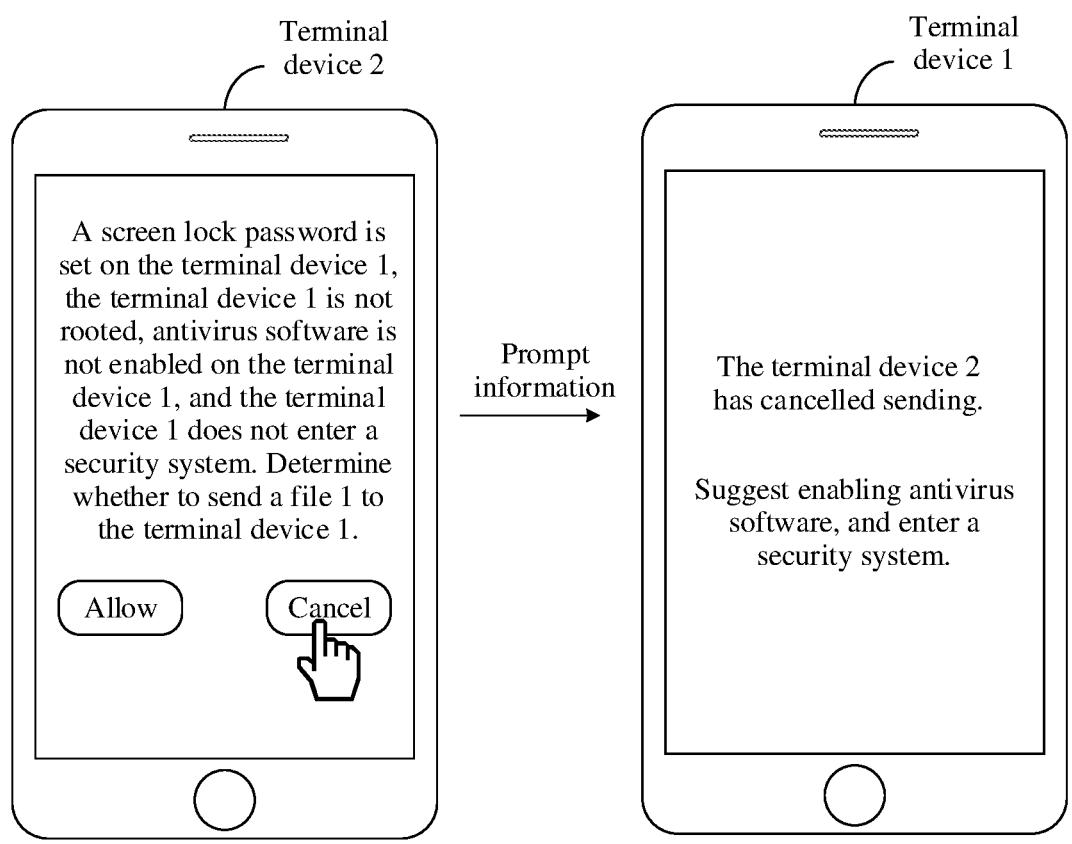
FIG. 13 is an example schematic diagram of an interface of a first terminal device and an interface of a second terminal device according to an embodiment of the present technology.

If the user taps, on the terminal device 2, a cancel button used to cancel sending of the file 1, the terminal device 2 determines that the terminal device 2 is not allowed to send the file 1 to the terminal device 1. In this case, the terminal device 2 may send prompt information to the terminal device 1, where the prompt information is used to prompt for a reason for canceling sending of the file 1 to the terminal device 1. For example, the prompt information prompts that the reason for canceling sending of the file 1 to the terminal device 1 is that antivirus software is not enabled and a security system is not entered. As shown in FIG. 12, after receiving the prompt information, the terminal device 2 outputs, based on the prompt information, the reason for canceling sending of the file 1 to the terminal device 1, where the reason is that antivirus software is not enabled and a security system is not entered. Alternatively, as shown in FIG. 13, after receiving the prompt information, the terminal device 2 suggests, based on the prompt information, enabling antivirus software, and entering a security system.

Figure 14:
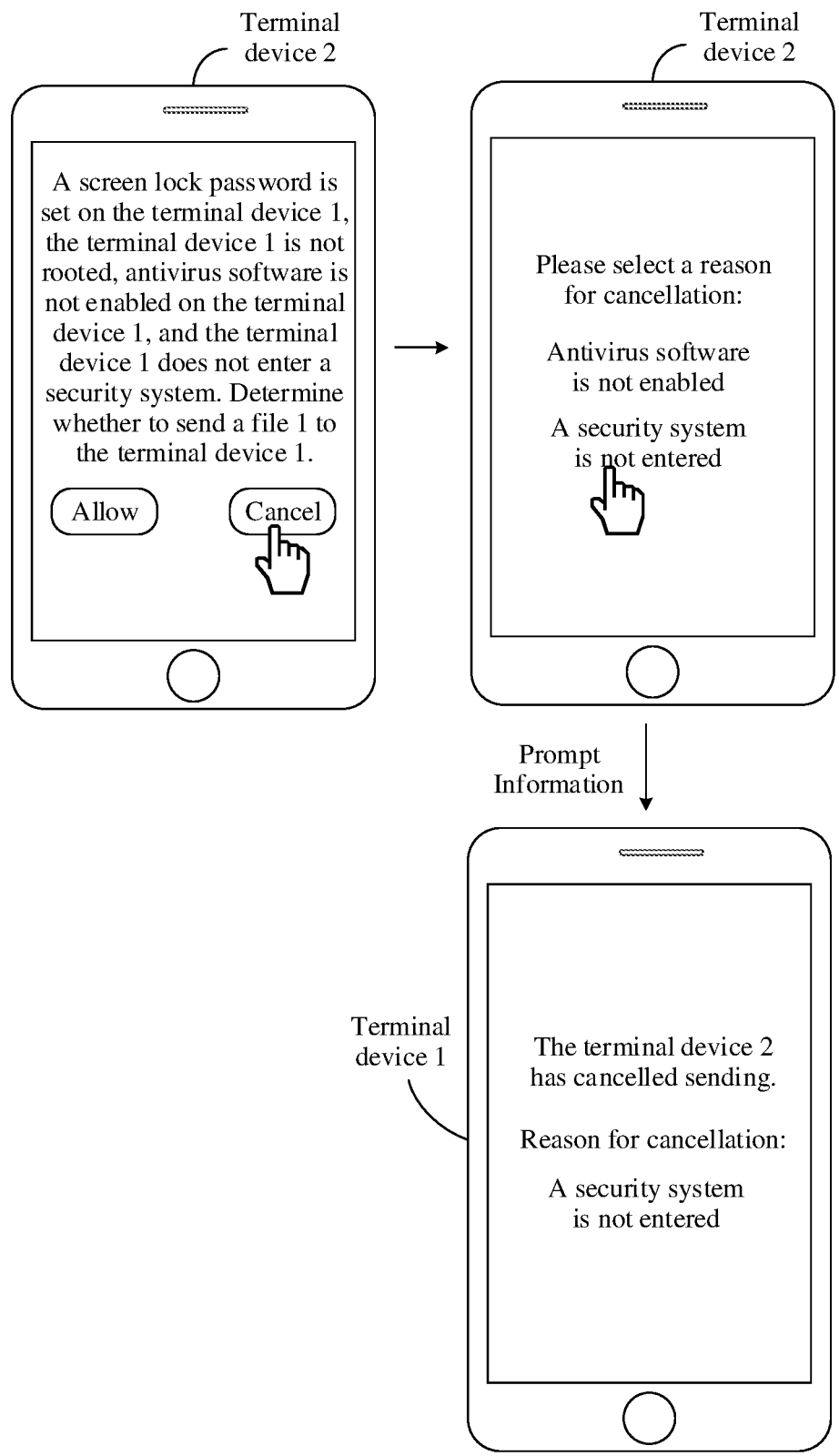
FIG. 14 is an example schematic diagram of an interface of a first terminal device and an interface of a second terminal device according to an embodiment of the present technology.

Optionally, after determining that the terminal device 2 is not allowed to send the file 1 to the terminal device 1, the terminal device 2 may alternatively output, based on the first security state, a reason option for canceling sending of the file 1 to the terminal device 2. As shown in FIG. 14, the reason options output by the terminal device 2 include that antivirus software is not enabled and a security system is not entered. The user may select one reason option. As shown in FIG. 14, if the user chooses not to enter the security system, the terminal device 2 sends prompt information to the terminal device 1, where the prompt information is used to prompt that the reason for canceling sending of the file 1 to the terminal device 1 is that the security system is not entered. After receiving the prompt information, the terminal device 2 outputs, based on the prompt information, the reason for canceling sending of the file 1 to the terminal device 1, where the reason is that a security system is not entered. Alternatively, after receiving the prompt information, the terminal device 2 indicates, based on the prompt information, to enter a security system. In FIG. 14, for example, after receiving the prompt information, the terminal device 2 outputs the reason for canceling sending of the file 1 to the terminal device 1. Certainly, if the terminal device 2 determines that the terminal device 2 is not allowed to send the file 1 to the terminal device 1, the terminal device 2 and the terminal device 1 may alternatively prompt, in another manner, the user to perform security configuration. This is not limited in this embodiment of this application.

Figure 15:
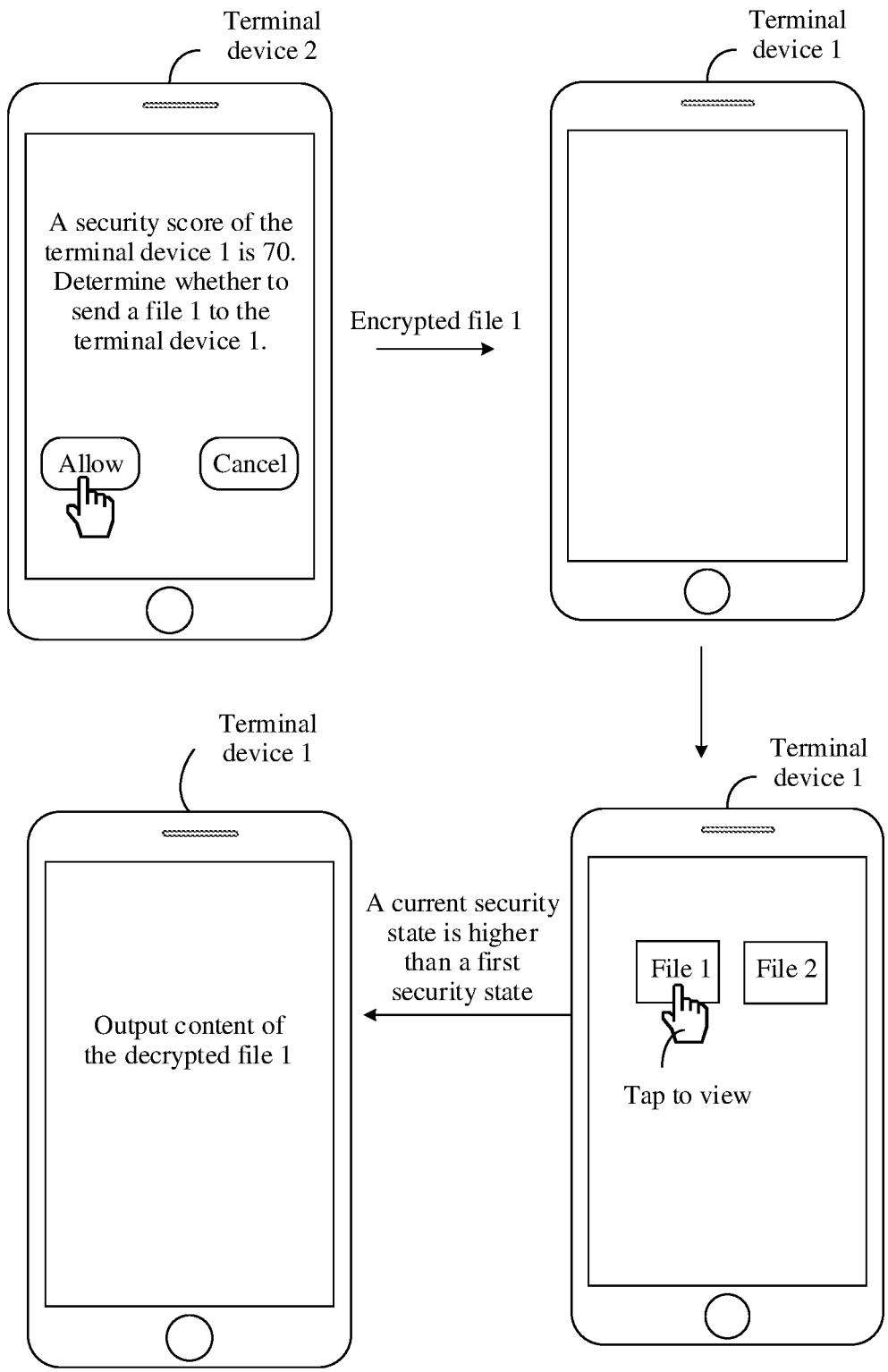
FIG. 15 is an example schematic diagram of an interface of a first terminal device and an interface of a second terminal device according to an embodiment of the present technology.

For another example, if the first security state is indicated by using a first security score, the first security score is 70. As shown in FIG. 15, the terminal device 2 may prompt, based on the first security score, that a current security score of the terminal device 1 is 70. The terminal device 2 further prompts whether the second terminal device is allowed to send a file 1 to the terminal device 1. If the user taps a send button, the terminal device 2 determines that the terminal device 2 is allowed to send the file to the first terminal device, and the terminal device 2 encrypts the file by using an encryption key, and sends the encrypted file to the terminal device 1. After receiving the encrypted file 1, the terminal device 1 stores the encrypted file 1. As shown in FIG. 15, in subsequent time, when a user 2 of the terminal device 1 needs to view content of the file 1, the user 2 may tap an icon of the file 1 on the terminal device 1, to enter an access instruction for the file 1. After receiving the access instruction, the terminal device 1 obtains a current security score. The current security score is 80. The terminal device 1 determines that a security state indicated by the current security score is higher than a first security state indicated by the first security score. Therefore, the terminal device 1 decrypts the file 1 by using a decryption key of the file 1.

Figure 16:
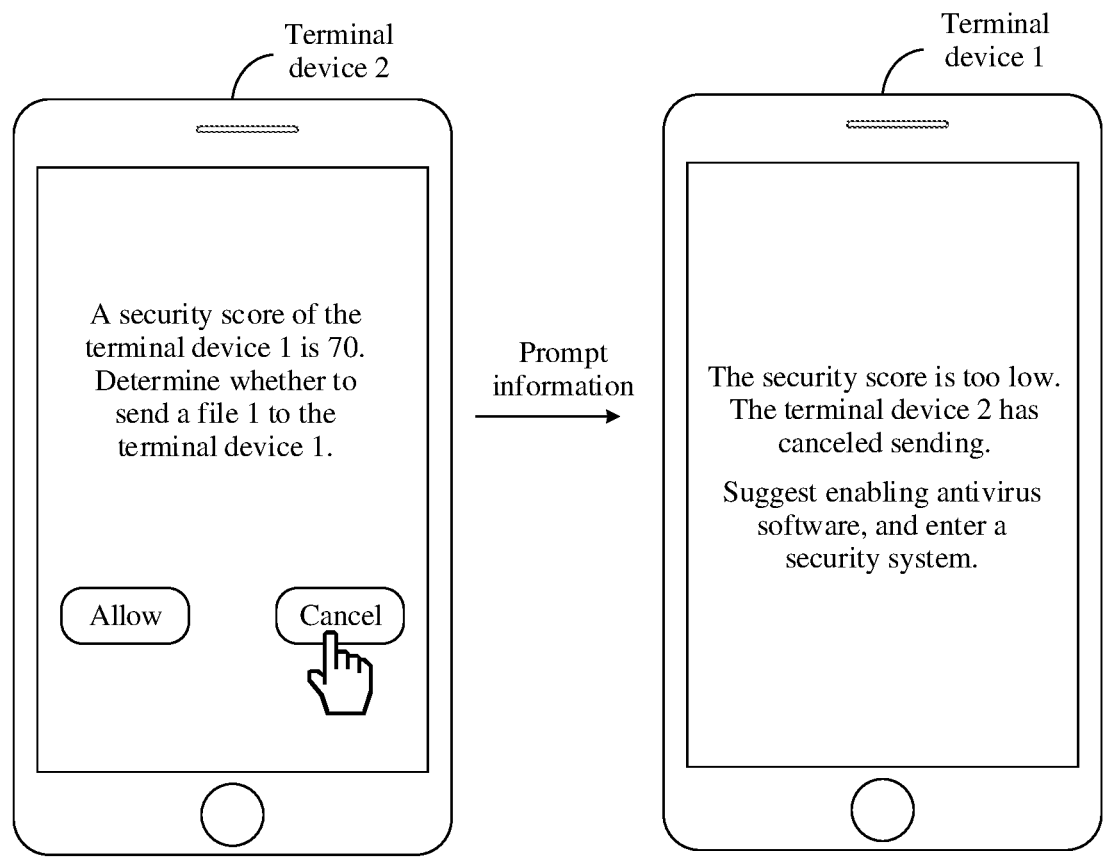
FIG. 16 is an example schematic diagram of an interface of a first terminal device and an interface of a second terminal device according to an embodiment of the present technology.

If the user taps a cancel button, the terminal device 2 determines that the terminal device 2 is not allowed to send the file to the terminal device 1. In this case, as shown in FIG. 16, the terminal device 2 may send prompt information to the terminal device 1, where the prompt information is used to prompt that sending of the file to the terminal device 1 is cancelled. After receiving the prompt information, the terminal device 1 prompts, based on the prompt, that sending of the file is cancelled. Optionally, the terminal device 1 may further output a security configuration suggestion. For example, as shown in FIG. 16, because the terminal device 1 does not enable antivirus software and does not enter a security system, the terminal device 1 may suggest enabling the antivirus software and entering the security system. A principle of indicating the first security state by using a security level is similar to the principle of indicating the first security state by using the security score.

In an optional implementation, a specific implementation in which the second terminal device determines, based on the first security state, whether the second terminal device is allowed to send the file to the first terminal device is as follows: The second terminal device determines whether the first security state is higher than or equal to a preset security state. When the first security state is higher than or equal to the preset security state, the second terminal device determines that the second terminal device is allowed to send the file to the first terminal device. When the first security state is lower than the preset security state, the second terminal device determines that the second terminal device is not allowed to send the file to the first terminal device. To be specific, in this implementation, the second terminal device may automatically determine, based on the first security state, whether to send the file to the first terminal device.

The preset security state may alternatively be indicated by using a preset security attribute value set, or indicated by using a preset security score, or indicated by using a preset security level. Alternatively, the preset security state may be indicated by using a combination of a preset security attribute value set and a preset security score, or the preset security state may be indicated by using a combination of a preset security attribute value set and a preset security level.

Optionally, when the first security state is indicated by using the first security attribute value set, and the preset security state is indicated by using the preset security attribute value, the second terminal device may determine whether the first security attribute value set matches all preset security attribute values. If the first security attribute value set matches all the preset security attribute values, the second terminal device determines that the first security state is equal to the preset security state; or if the first security attribute value set does not match all the preset security attribute values, the second terminal device determines that the first security state is lower than the preset security state.

For example, the preset security attribute value set is {value of an attribute indicating whether a screen lock password is set is equal to 1, value of an attribute indicating whether the first terminal device is rooted is equal to 0, value of an attribute indicating whether antivirus software is enabled is equal to 1}. The first security attribute value set is {value of an attribute indicating whether a screen lock password is set is equal to 0, value of an attribute indicating whether the first terminal device is rooted is equal to 0, value of an attribute indicating whether antivirus software is enabled is equal to 0}. Values of the attributes indicating whether the screen lock password is set that are in the two attribute value sets do not match, and values of the attributes indicating whether the antivirus software is enabled that are in the two attribute value sets do not match. Therefore, the second terminal device determines that the first security state is lower than the preset security state, and in this case, the second terminal device determines that the second terminal device is not allowed to send the file to the first terminal device.

For another example, the preset security attribute value set is {value of an attribute indicating whether a screen lock password is set is equal to 1, value of an attribute indicating whether the first terminal device is rooted is equal to 0, value of an attribute indicating whether antivirus software is enabled is equal to 1}. The first security attribute value set is {value of an attribute indicating whether a screen lock password is set is equal to 1, value of an attribute indicating whether the first terminal device is rooted is equal to 0, value of an attribute indicating whether antivirus software is enabled is equal to 1}. The first security attribute value set matches all preset security attribute values. Therefore, the second terminal device determines that the first security state is equal to the preset security state, and in this case, the second terminal device determines that the second terminal device is allowed to send the file to the first terminal device.

Optionally, when the first security state is indicated by using the first security attribute value set, and the preset security state is indicated by using the preset security attribute value, the second terminal device may determine whether a security score corresponding to the first security attribute value set is greater than or equal to a security score corresponding to the preset security attribute value. If the security score corresponding to the first security attribute value set is greater than or equal to the security score corresponding to the preset security attribute value set, the second terminal device determines that the first security state is higher than or equal to the preset security state; or if the security score corresponding to the first security attribute value set is less than the security score corresponding to the preset security attribute value set, the second terminal device determines that the first security state is lower than the preset security state. For a specific principle of obtaining the security score corresponding to the security attribute value, refer to the related descriptions in the embodiment corresponding to FIG. 4.

Optionally, when the first security state is indicated by using the first security score, and the preset security state is indicated by using the preset security score, the second terminal device determines whether the first security score is greater than the preset security score. When the first security score is greater than or equal to the preset security score, the second terminal device determines that the first security state is higher than or equal to the preset security state. When the first security score is less than the preset security score, the second terminal device determines that the first security state is lower than the preset security state.

Optionally, when the first security state is indicated by using the first security level, and the preset security state is indicated by using the preset security level, the second terminal device determines whether the first security level is greater than the preset security level. When the first security level is greater than or equal to the preset security level, the second terminal device determines that the first security state is higher than or equal to the preset security state. When the first security level is less than the preset security level, the second terminal device determines that the first security state is lower than the preset security state.

Figure 17A:
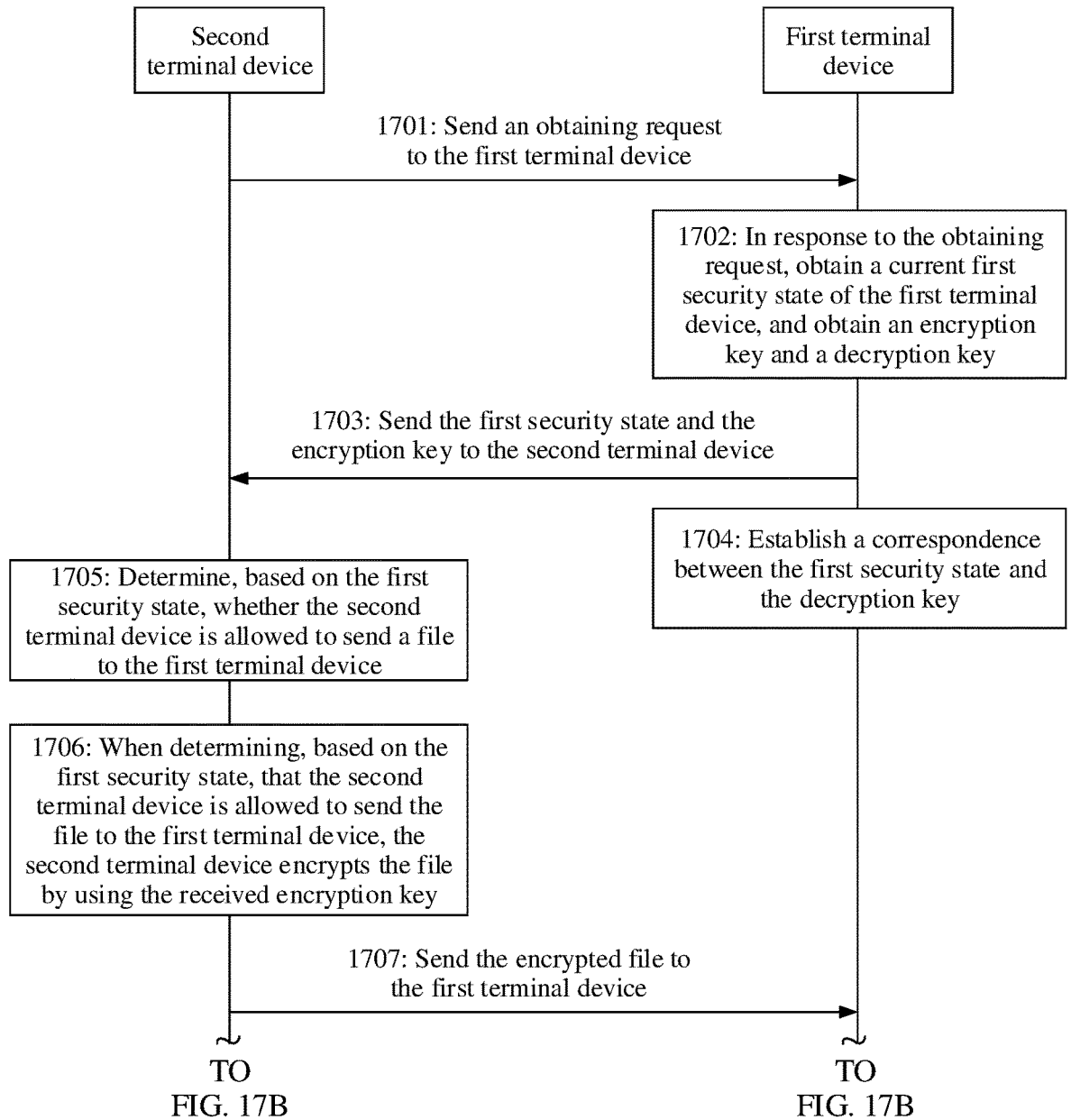

FIG. 17A and FIG. 17B are a schematic flowchart of a file processing method according to an embodiment of this application. As shown in FIG. 17A and FIG. 17B, the file processing method includes step 1701 to step 1713.

1701: A second terminal device sends an obtaining request to a first terminal device.

1702: In response to the obtaining request, the first terminal device obtains a current first security state of the first terminal device, and obtains an encryption key and a decryption key.

In this embodiment of this application, after receiving the obtaining request from the second terminal device, in response to the obtaining request, the first terminal device obtains the current first security state of the first terminal device, and obtains the encryption key and the decryption key.

The first terminal device may obtain the encryption key and the decryption key in the following several manners.

Manner 1: The first terminal device generates the encryption key and the decryption key. In Manner 1, the first terminal device may randomly generate the encryption key and the decryption key. Alternatively, the first terminal device may derive and generate the encryption key and the decryption key based on a master key of the first terminal device. The master key of the first terminal device is a topmost key of the first terminal device. Specifically, a key management module of the first terminal device may generate the encryption key and the decryption key, and the key management module of the first terminal device may store the decryption key.

Manner 2: The first terminal device obtains the encryption key and the decryption key from another device (for example, a server). In Manner 2, the first terminal device may send a key request to the server. After receiving the key request, the server may generate the encryption key and the decryption key, and send the encryption key and the decryption key to the first terminal device. Correspondingly, the first terminal device may receive the encryption key and the decryption key.

1703: The first terminal device sends the first security state and the encryption key to the second terminal device.

Figure 18A:
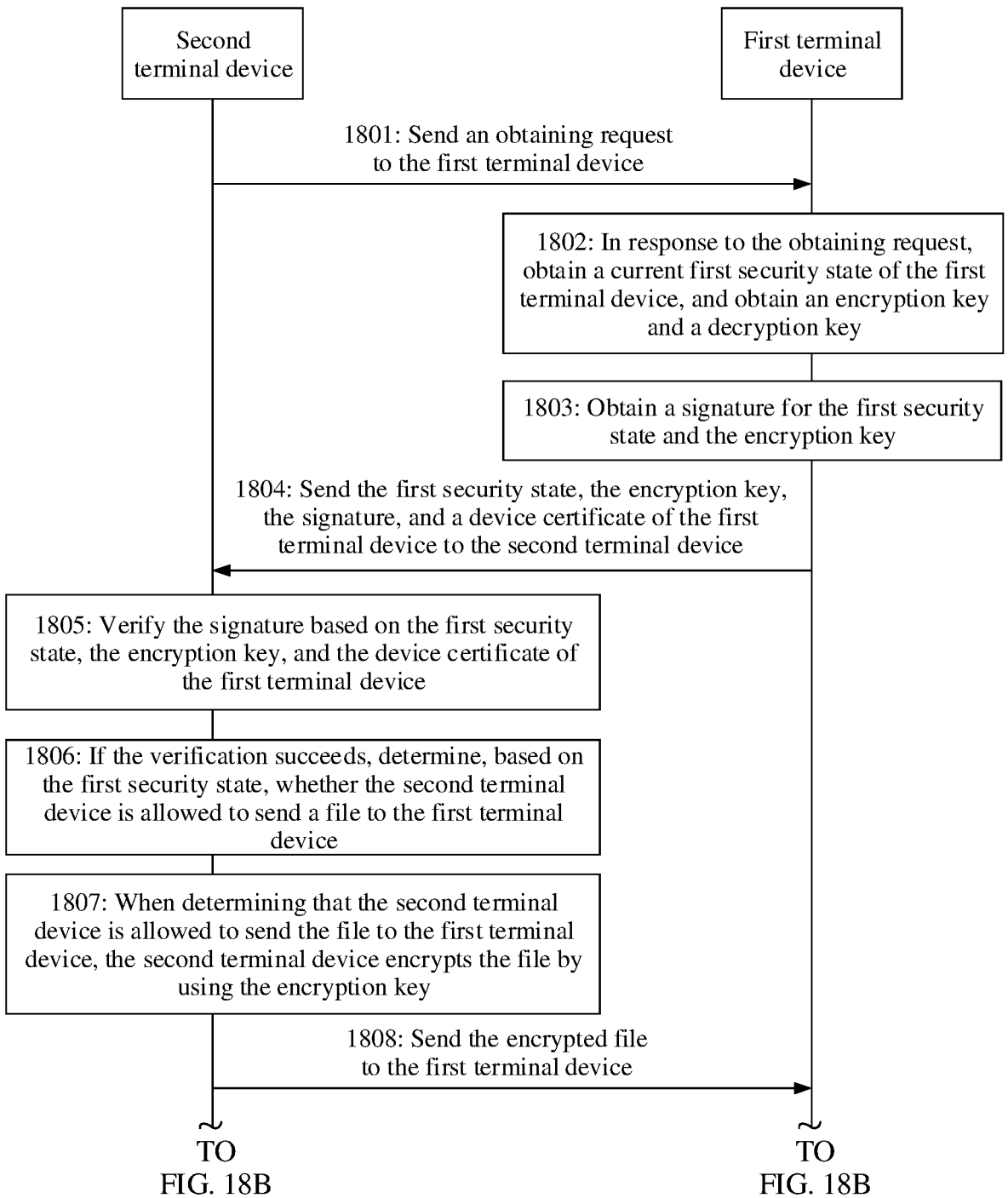
FIG. 18A and FIG. 18B are example schematic flowcharts of another file processing method according to an embodiment of the present technology.
Figure 18B:
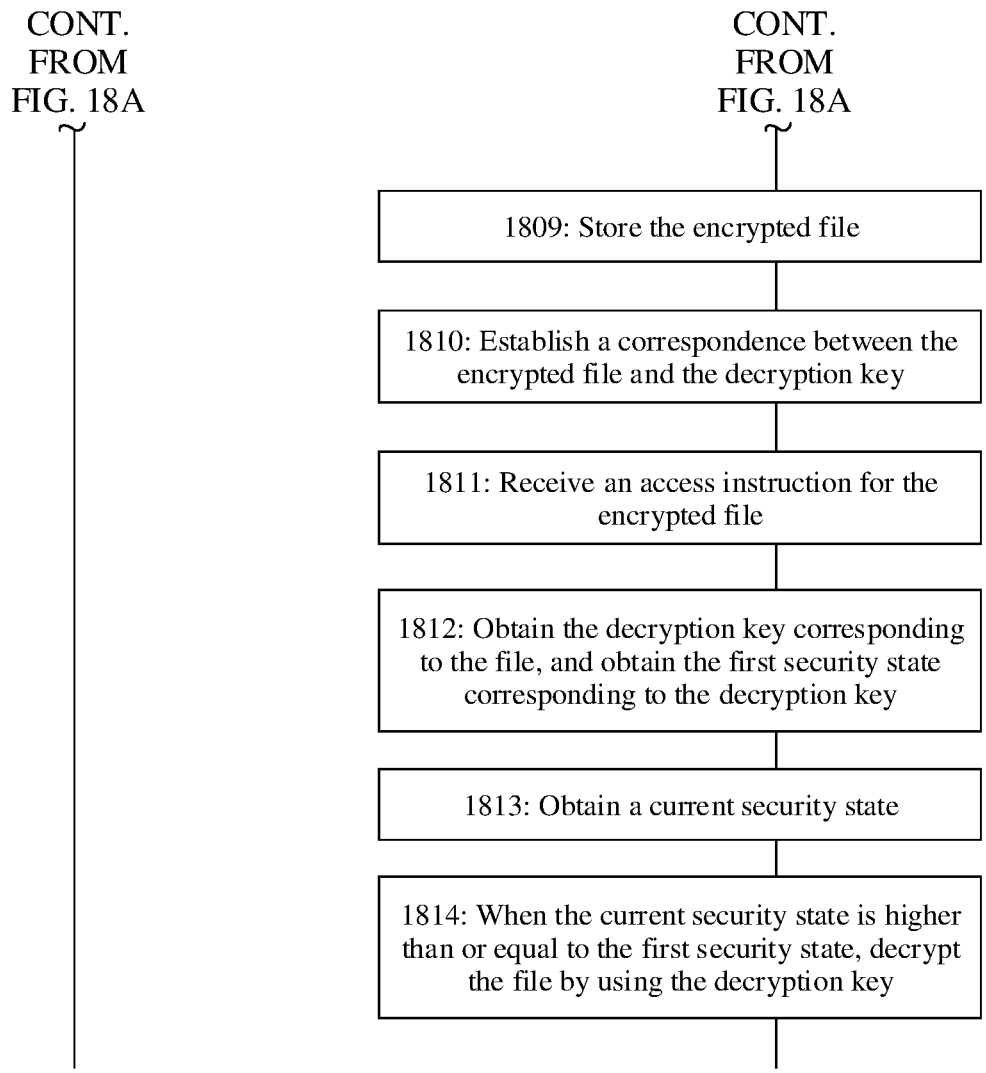

In an optional implementation, as shown in FIG. 18A and FIG. 18B, after obtaining the current first security state of the first terminal device, and obtaining the encryption key and the decryption key, the first terminal device may further obtain a signature for the first security state and the encryption key. The first terminal device may specifically send the first security state, the encryption key, the signature, and a device certificate of the first terminal device to the second terminal device. After receiving the first security state, the encryption key, the signature, and the device certificate of the first terminal device that are sent by the first terminal device, the second terminal device verifies the signature based on the first security state, the encryption key, and the device certificate of the first terminal device. If the verification succeeds, it indicates that the first security state and the encryption key are sent by the first terminal device. Therefore, if the verification succeeds, the second terminal device may determine, based on the first security state, whether the second terminal device is allowed to send a file to the first terminal device. If the verification fails, the second terminal device may prompt that the second terminal device has a security risk. In this case, the second terminal device does not send a file to the first terminal device. Therefore, based on the optional implementation, the security risk can be identified, to help improve file security.

If the encryption key and the decryption key that are obtained by the first terminal device are asymmetric keys, the encryption key may be a public key, and the decryption key may be a private key.

1704: The first terminal device establishes a correspondence between the first security state and the decryption key.

Specifically, the key management module of the first terminal device may establish the correspondence between the first security state and the decryption key.

Step 1703 and step 1704 are not subject to a specific sequence.

1705: The second terminal device determines, based on the first security state, whether the second terminal device is allowed to send the file to the first terminal device.

In this embodiment of this application, after receiving the first security state and the encryption key, the second terminal device determines, based on the first security state, whether the second terminal device is allowed to send the file to the first terminal device.

1706: When the second terminal device determines, based on the first security state, that the second terminal device is allowed to send the file to the first terminal device, the second terminal device encrypts the file by using the received encryption key.

1707: The second terminal device sends the encrypted file to the first terminal device.

1708: The first terminal device stores the encrypted file.

In this embodiment of this application, after the first terminal device receives the encrypted file from the second terminal device, the first terminal device stores the encrypted file.

For specific implementation principles of step 1705 to step 1708, refer to the specific implementation principles of step 704 to step 707 in FIG. 7.

1709: The first terminal device establishes a correspondence between the encrypted file and the decryption key.

In this embodiment of this application, after receiving the encrypted file from the second terminal device, the first terminal device establishes the correspondence between the encrypted file and the decryption key.

Specifically, the key management module of the first terminal device may establish the correspondence between the encrypted file and the decryption key.

1710: The first terminal device receives an access instruction for the encrypted file.

For a specific implementation principle of step 1710, refer to the specific implementation principle of step 403 in FIG. 4.

1711: The first terminal device obtains the decryption key corresponding to the file, and obtains the first security state corresponding to the decryption key.

The key management module of the first terminal device may obtain the decryption key corresponding to the file, and obtain the first security state corresponding to the decryption key.

1712: The first terminal device obtains a current security state.

1713: When the current security state is higher than or equal to the first security state, the first terminal device decrypts the file by using the decryption key.

For specific implementation principles of step 1712 and step 1713, refer to the specific implementation principles of step 404 and step 405 in FIG. 4.

According to the method described in FIG. 17A and FIG. 17B, the first terminal device may generate the encryption key and the decryption key.

Figure 19A:
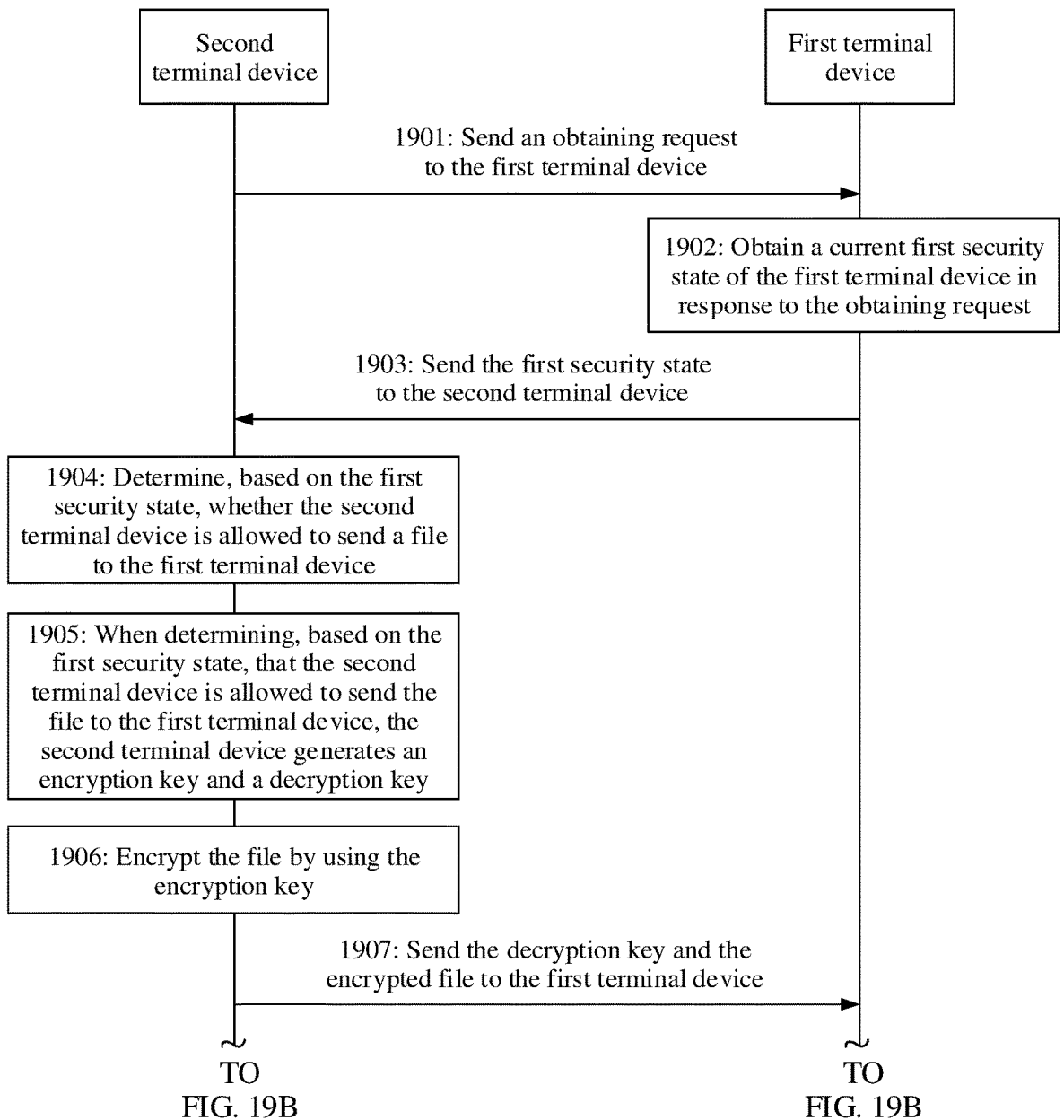

FIG. 19A and FIG. 19B show a file processing method according to an embodiment of this application. As shown in FIG. 19A and FIG. 19B, the file processing method includes step 1901 to step 1913.

1901: A second terminal device sends an obtaining request to a first terminal device.

1902: The first terminal device obtains a current first security state of the first terminal device in response to the obtaining request.

1903: The first terminal device sends the first security state to the second terminal device.

1904: The second terminal device determines, based on the first security state, whether the second terminal device is allowed to send a file to the first terminal device.

In this embodiment of this application, after receiving the first security state and the encryption key, the second terminal device determines, based on the first security state, whether the second terminal device is allowed to send the file to the first terminal device.

For specific implementation principles of step 1901 to step 1904, refer to the specific implementation principles of step 701 to step 704 in FIG. 7.

1905: When the second terminal device determines, based on the first security state, that the second terminal device is allowed to send the file to the first terminal device, the second terminal device generates an encryption key and a decryption key.

It may be understood that when the second terminal device determines, based on the first security state, that the second terminal device is allowed to send the file to the first terminal device, the second terminal device generates the encryption key and the decryption key in the following two manners: Manner 1: When the second terminal device determines, based on the first security state, that the second terminal device is allowed to send the file to the first terminal device, the second terminal device is triggered to generate the encryption key and the decryption key. Manner 2: The second terminal device generates the encryption key and the decryption key within a period of time after the second terminal device determines, based on the first security state, that the second terminal device is allowed to send the file to the first terminal device. The encryption key and the decryption key may be keys for a symmetric algorithm. In this case, the encryption key and the decryption key are the same. Alternatively, the encryption key and the decryption key may be keys for an asymmetric algorithm. In this case, the encryption key is a private key, and the decryption key is a public key.

1906: The second terminal device encrypts the file by using the encryption key.

1907: The second terminal device sends the decryption key and the encrypted file to the first terminal device.

1908: The first terminal device stores the encrypted file.

In this embodiment of this application, after the first terminal device receives the encrypted file from the second terminal device, the first terminal device stores the encrypted file.

For specific implementation principles of step 1906 to step 1908, refer to the corresponding descriptions in the foregoing method embodiments.

1909: The first terminal device establishes a correspondence between the encrypted file and the decryption key, and establishes a correspondence between the first security state and the decryption key.

In this embodiment of this application, after receiving the decryption key and the encrypted file from the second terminal device, the first terminal device establishes the correspondence between the encrypted file and the decryption key, and establishes the correspondence between the first security state and the decryption key.

The key management module of first terminal device may establish the correspondence between the encrypted file and the decryption key, and establish the correspondence between the first security state and the decryption key.

1910: The first terminal device receives an access instruction for the encrypted file.

1911: The first terminal device obtains the decryption key corresponding to the file, and obtains the first security state corresponding to the decryption key.

The key management module of the first terminal device may obtain the decryption key corresponding to the file, and obtain the first security state corresponding to the decryption key.

1912: The first terminal device obtains a current security state.

1913: When the current security state is higher than or equal to the first security state, the first terminal device decrypts the file by using the decryption key.

For specific implementation principles of step 1910 to step 1913, refer to the corresponding descriptions in the foregoing method embodiments.

According to the method described in FIG. 19A and FIG. 19B, the second terminal device may generate the encryption key and the decryption key.

In the embodiments of the present technology, the device may be divided into function modules based on the foregoing method examples. For example, each function module may be obtained through division based on each corresponding function, or two or more functions may be integrated into one module. The integrated module may be implemented in a form of hardware, or may be implemented in a form of a software function module. It should be noted that in the embodiments of the present technology, division into the modules is an example and is merely logical function division, and may be other division in an actual implementation.

Figure 20:
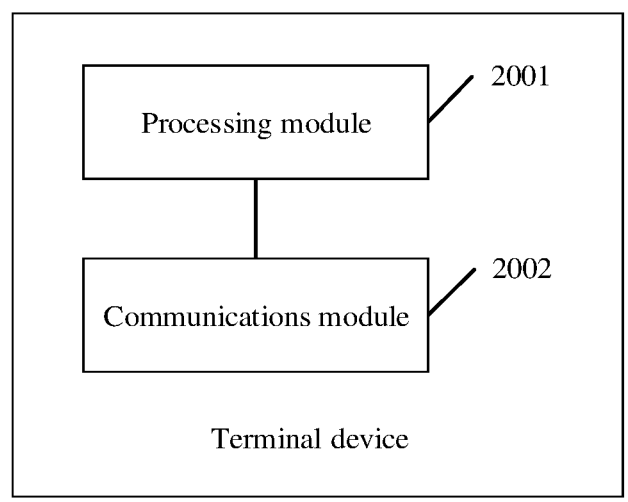
FIG. 20 is an example schematic structural diagram of another terminal device according to an embodiment of the present technology.

FIG. 20 is a schematic structural diagram of a terminal device according to an embodiment of this application. The terminal device 2000 shown in FIG. 20 may be configured to perform an operation performed by the first terminal device or the second terminal device in the foregoing method embodiments. The terminal device 2000 shown in FIG. 20 may include a processing module 2001 and a communications module 2002.

When the terminal device 2000 is configured to perform the operation performed by the first terminal device in the foregoing method embodiments, the communications module 2002 is configured to receive an encrypted file from a second terminal device; the processing module 2001 is configured to store the encrypted file; the processing module 2001 is further configured to receive an access instruction for the encrypted file; the processing module 2001 is further configured to obtain a current security state; and the processing module 2001 is further configured to when the current security state is higher than or equal to a first security state, decrypt the file by using a decryption key.

The processing module 2001 may further include a key management module, and the key management module may determine whether the current security state is higher than or equal to the first security state.

In an optional implementation, the first security state is a security state corresponding to the decryption key. Before the communications module 2002 receives the encrypted file from the second terminal device, the communications module 2002 is further configured to receive an obtaining request from the second terminal device. The processing module 2001 is further configured to obtain the current first security state of the terminal device 2000 in response to the obtaining request. The communications module 2002 is further configured to send the first security state to the second terminal device.

In an optional implementation, the processing module 2001 is further configured to obtain an encryption key and the decryption key in response to the obtaining request. The communications module 2002 is further configured to send the encryption key to the second terminal device. The processing module 2001 is further configured to establish a correspondence between the first security state and the decryption key. The processing module 2001 is further configured to establish a correspondence between the file and the decryption key after the communications module 2002 receives the encrypted file from the second terminal device.

The key management module may obtain the encryption key and the decryption key, establish the correspondence between the first security state and the decryption key, and establish the correspondence between the file and the decryption key.

In an optional implementation, the communications module 2002 is further configured to receive the decryption key from the second terminal device before the processing module 2001 receives the access instruction for the encrypted file. The processing module 2001 is further configured to establish a correspondence between the file and the decryption key, and establish a correspondence between the first security state and the decryption key.

The key management module may establish the correspondence between the file and the decryption key, and establish the correspondence between the first security state and the decryption key.

In an optional implementation, the processing module 2001 is further configured to obtain a signature for the first security state after obtaining the current first security state of the terminal device 2000. A manner in which the communications module 2002 sends the first security state to the second terminal device can include sending the first security state, the signature, and a device certificate of the terminal device 2000 to the second terminal device.

In an optional implementation, the processing module 2001 is further configured to, when the current security state is lower than the first security state, prompt that the file cannot be accessed and prompt for a reason why the file cannot be accessed.

In an optional implementation, the processing module 2001 is further configured to: when the current security state is lower than the first security state, output a security configuration function button based on the current security state.

When the terminal device 2000 is configured to perform the operation performed by the second terminal device in the foregoing method embodiments, the communications module 2002 is configured to send an obtaining request to a first terminal device; the communications module 2002 is further configured to receive a first security state of the first terminal device that is sent by the first terminal device in response to the obtaining request; the processing module 2001 is configured to determine, based on the first security state, whether the terminal device 2000 is allowed to send a file to the first terminal device; the processing module 2001 is further configured to, when the processing module 2001 determines, based on the first security state, that the terminal device 2000 is allowed to send the file to the first terminal device, encrypt the file by using an encryption key; and the communications module 2002 is further configured to send the encrypted file to the first terminal device.

In an optional implementation, the communications module 2002 is further configured to, before the processing module 2001 determines, based on the first security state, whether the terminal device 2000 is allowed to send the file to the first terminal device, receive the encryption key sent by the first terminal device in response to the obtaining request.

In an optional implementation, the processing module 2001 is further configured to generate the encryption key and a decryption key before encrypting the file by using the encryption key. The communications module 2002 is further configured to send the decryption key to the first terminal device after the processing module 2001 generates the encryption key and the decryption key.

In an optional implementation, a manner in which the communications module 2002 receives the first security state of the first terminal device that is sent by the first terminal device in response to the obtaining request can include receiving the first security state of the first terminal device, a signature, and a device certificate of the first terminal device that are sent by the first terminal device in response to the obtaining request, where the signature is a signature for the first security state.

The processing module 2001 is further configured to verify the signature based on the first security state and the device certificate of the first terminal device. If the verification succeeds, the processing module 2001 determines, based on the first security state, whether the terminal device 2000 is allowed to send the file to the first terminal device.

In an optional implementation, a manner in which the processing module 2001 determines, based on the first security state, whether the terminal device 2000 is allowed to send the file to the first terminal device can include prompting for a security state of the first terminal device based on the first security state, and prompting whether the terminal device 2000 is allowed to send the file to the first terminal device; and when receiving a sending allowed operation of a user, determining that the terminal device 2000 is allowed to send the file to the first terminal device; or when receiving a sending cancelled operation of a user, determining that the terminal device 2000 is not allowed to send the file to the first terminal device.

In an optional implementation, a manner in which the processing module 2001 determines, based on the first security state, whether the terminal device 2000 is allowed to send the file to the first terminal device can include determining whether the first security state is higher than or equal to a preset security state; and when the first security state is higher than or equal to the preset security state, determining that the terminal device 2000 is allowed to send the file to the first terminal device; or when the first security state is lower than the preset security state, determining that the terminal device 2000 is not allowed to send the file to the first terminal device.

In an optional implementation, the communications module 2002 is further configured to: when the processing module 2001 determines that the terminal device 2000 is not allowed to send the file to the first terminal device, send prompt information to the first terminal device, where the prompt information is used to prompt for a reason for canceling sending of the file to the first terminal device.

In an optional implementation, the processing module 2001 is further configured to: when determining that the terminal device 2000 is not allowed to send the file to the first terminal device, output a reason option for canceling sending of the file to the first terminal device. The processing module 2001 is further configured to receive a selection operation performed by the user on one reason option, where the prompt information includes a reason for selecting the selection operation.

In an optional implementation, the processing module 2001 is further configured to: before the communications module 2002 sends the obtaining request to the first terminal device, receive a data sending instruction used to send the file to the first terminal device. The processing module 2001 is further configured to determine whether the file is data of a preset protection type. If the file is the data of the preset protection type, the communications module 2002 sends the obtaining request to the first terminal device.

In an optional implementation, the processing module 2001 is further configured to, before the communications module 2002 sends the obtaining request to the first terminal device, output file sending mode options; receive a selection operation performed by the user on an option of a secure file sending mode in the file sending mode options; and enter the secure file sending mode in response to the selection operation. A manner in which the communications module 2002 sends the obtaining request to the first terminal device can include sending the obtaining request to the first terminal device in the secure file sending mode.

Based on a same technical concept, a problem-resolving principle of the terminal device provided in the embodiments of this application is similar to that of the first terminal device or the second terminal device in the method embodiments of this application. Therefore, for implementations of the device, refer to the implementations of the method.

It should be noted that in the foregoing embodiments, the descriptions of the embodiments have respective focuses. For a part that is not described in detail in an embodiment, refer to related descriptions in other embodiments.

Steps in the methods in the embodiments of the present technology may be adjusted, combined, or deleted based on an actual requirement.

The modules in the terminal device in the embodiments of the present technology may be combined, divided, or deleted based on an actual requirement.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, all or some of the procedures or the functions according to the embodiments of this application are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a storage disk, or a magnetic tape), an optical medium (for example, a DVD), a semiconductor medium (for example, a solid-state drive (SSD)), or the like.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A file processing method, comprising:
   receiving, by a first terminal device, an encrypted file from a second terminal device;
   storing, by the first terminal device, the encrypted file;
   receiving, by the first terminal device, an access instruction for the encrypted file;
   obtaining, by the first terminal device, a current security state; and
   when the current security state is higher than or equal to a first security state, decrypting, by the first terminal device, the encrypted file by using a decryption key, wherein
   the first security state is a security state corresponding to the decryption key.

2. The method according to claim 1, wherein
   before receiving the encrypted file from the second terminal device, the method further comprises:
   receiving, by the first terminal device, an obtaining request from the second terminal device;
     obtaining, by the first terminal device, the first security state of the first terminal device in response to the obtaining request; and
     sending, by the first terminal device, the first security state to the second terminal device.

3. The method according to claim 2, further comprising:
   obtaining, by the first terminal device, an encryption key and the decryption key in response to the obtaining request;
   sending, by the first terminal device, the encryption key to the second terminal device; and
   establishing, by the first terminal device, a correspondence between the first security state and the decryption key; and
   after receiving the encrypted file from the second terminal device, the method further comprises:
   establishing, by the first terminal device, a correspondence between the encrypted file and the decryption key.

4. The method according to claim 2, wherein before receiving the access instruction for the encrypted file, the method further comprises:
   receiving, by the first terminal device, the decryption key from the second terminal device; and
   establishing, by the first terminal device, a correspondence between the encrypted file and the decryption key, and establishing a correspondence between the first security state and the decryption key.

5. The method according to claim 2, wherein after obtaining the current first security state of the first terminal device, the method further comprises:
   obtaining, by the first terminal device, a signature for the first security state, wherein
   sending the first security state to the second terminal device comprises:
     sending, by the first terminal device, the first security state, the signature for the first security state, and a device certificate of the first terminal device to the second terminal device.

6. The method according to claim 1, further comprising:
   when the current security state is lower than the first security state:
     prompting, by the first terminal device, that the encrypted file cannot be accessed and prompting for a reason why the encrypted file cannot be accessed; and
     outputting, by the first terminal device, a security configuration function button based on the current security state.

7. A file processing method, comprising:
   sending, by a second terminal device, an obtaining request to a first terminal device;

receiving, by the second terminal device, a first security state of the first terminal device in response to the obtaining request sent to the first terminal device;

determining, by the second terminal device and based on the first security state, whether the second terminal device is allowed to send a file to the first terminal device;

when the second terminal device determines, based on the first security state, that the second terminal device is allowed to send the file to the first terminal device, encrypting, by the second terminal device, the file by using an encryption key; and sending, by the second terminal device, the encrypted file to the first terminal device.

8. The method according to claim 7, wherein before determining whether the second terminal device is allowed to send the file to the first terminal device, the method further comprises:

receiving, by the second terminal device, the encryption key sent by the first terminal device in response to the obtaining request.

9. The method according to claim 7, wherein before encrypting the file by using the encryption key, the method further comprises:

generating, by the second terminal device, the encryption key and a decryption key; and after generating the encryption key and the decryption key, sending, by the second terminal device, the decryption key to the first terminal device.

10. The method according to claim 7, wherein receiving the first security state of the first terminal device comprises:

receiving, by the second terminal device, the first security state of the first terminal device, a signature, and a device certificate of the first terminal device, wherein the signature is a signature for the first security state;

verifying, by the second terminal device, the signature based on the first security state and the device certificate of the first terminal device; and if the verification succeeds, determining, by the second terminal device based on the first security state, whether the second terminal device is allowed to send the file to the first terminal device.

11. The method according to claim 7, wherein determining whether the second terminal device is allowed to send the file to the first terminal device comprises:

prompting, by the second terminal device, for a security state of the first terminal device based on the first security state, and prompting whether the second terminal device is allowed to send the file to the first terminal device; and when the second terminal device receives a sending allowed operation of a user, determining, by the second terminal device, that the second terminal device is allowed to send the file to the first terminal device; or when the second terminal device receives a sending cancelled operation of the user, determining, by the second terminal device, that the second terminal device is not allowed to send the file to the first terminal device.

12. The method according to claim 7, wherein determining whether the second terminal device is allowed to send the file to the first terminal device comprises:

determining, by the second terminal device, whether the first security state is higher than or equal to a preset security state; and when the first security state is higher than or equal to the preset security state, determining, by the second terminal device, the second terminal device is allowed to send the file to the first terminal device; or when the first security state is lower than the preset security state, determining, by the second terminal device, that the second terminal device is not allowed to send the file to the first terminal device.

13. The method according to claim 7, further comprising:

when determining that the second terminal device is not allowed to send the file to the first terminal device, sending, by the second terminal device, prompt information to the first terminal device, wherein the prompt information is used to prompt for a reason for canceling sending of the file to the first terminal device.

14. The method according to claim 13, further comprising:

when determining that the second terminal device is not allowed to send the file to the first terminal device, outputting, by the second terminal device, a reason option for canceling sending of the file to the first terminal device; and receiving, by the second terminal device, a selection operation performed by the user on the reason option, wherein the prompt information comprises a reason for selecting the selection operation.

15. The method according to claim 7, wherein before sending the obtaining request to the first terminal device, the method further comprises:

receiving, by the second terminal device, a data sending instruction used to send the file to the first terminal device;

determining, by the second terminal device, whether the file is data of a preset protection type; and if the file is the data of the preset protection type, sending, by the second terminal device, the obtaining request to the first terminal device.

16. The method according to claim 7, wherein before sending the obtaining request to the first terminal device, the method further comprises:

outputting, by the second terminal device, a file sending mode option;

receiving, by the second terminal device, a selection operation performed by the user on an option of a secure file sending mode in the file sending mode option; and entering, by the second terminal device, the secure file sending mode in response to the selection operation, wherein sending the obtaining request to the first terminal device comprises:

sending, by the second terminal device, the obtaining request to the first terminal device in the secure file sending mode.

17. A first device, comprising:

a processor; and a memory storing instructions that, when executed by the processor, cause the first device to:

send an obtaining request to a second device;

receive a first security state of the second device in response to the obtaining request sent to the second device;

determine, based on the first security state, whether the first device is allowed to send a file to the second device;

when the first device determines, based on the first security state, that the first device is allowed to send the file to the second device, encrypt the file by using an encryption key; and send the encrypted file to the second device.

18. The first device according to claim 17, wherein determining whether the first device is allowed to send the file to the second device comprises:

prompting for a security state of the second device based on the first security state, and prompting whether the first device is allowed to send the file to the second device; and when the first device receives a sending allowed operation of a user, determining that the first device is allowed to send the file to the second device; or when the first device receives a sending cancelled operation of a user, determining that the first device is not allowed to send the file to the second device.

19. The first device according to claim 17, wherein determining whether the first device is allowed to send the file to the second device comprises:

determining whether the first security state is higher than or equal to a preset security state; and when the first security state is higher than or equal to the preset security state, determining the first device is allowed to send the file to the second device; or when the first security state is lower than the preset security state, determining that the first device is not allowed to send the file to the second device.

20. The first device according to claim 17, wherein the first device is further caused to:

receive the encryption key sent by the second device in response to the obtaining request.

* * * * *